United States Patent
Sinha et al.

(10) Patent No.: US 9,210,467 B2
(45) Date of Patent: Dec. 8, 2015

(54) METHOD AND SYSTEM FOR A UNIVERSAL REMOTE CONTROL

(71) Applicant: Turner Broadcasting System, Inc., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 224 days.

(21) Appl. No.: 13/730,627

(22) Filed: Dec. 28, 2012

(65) Prior Publication Data

US 2013/0205212 A1 Aug. 8, 2013

Related U.S. Application Data

(60) Provisional application No. 61/596,012, filed on Feb. 7, 2012.

(51) Int. Cl.
*G06F 3/00* (2006.01)
*H04N 21/44* (2011.01)
(Continued)

(52) U.S. Cl.
CPC ........ *H04N 21/44008* (2013.01); *G06F 3/0484* (2013.01); *G06F 17/30495* (2013.01); *G06T 1/0021* (2013.01); *H04N 21/00* (2013.01);
(Continued)

(58) Field of Classification Search
None
See application file for complete search history.

(56) References Cited

U.S. PATENT DOCUMENTS 5,305,464 A  4/1994  Frett
5,410,326 A  4/1995  Goldstein
(Continued)

FOREIGN PATENT DOCUMENTS

EP  1485815  10/2007
EP  1354276  12/2007
(Continued)

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.
(Continued)

*Primary Examiner* — Matt Kim
*Assistant Examiner* — Hua Lu
(74) *Attorney, Agent, or Firm* — Loza & Loza, LLP; Hopeton S. Walker

(57) ABSTRACT

A method and system for a universal remote control used with display devices that support automatic content recognition (ACR) are described. The remote control may be paired to the display device and may receive a trigger signal from the display device that corresponds to an interactive event overlay displayed on the display device as a result of the ACR operations. The pairing may occur through the use of near field communication (NFC) signals and/or WiFi signals. A graphical user interface (GUI) may be generated for display on a screen of the remote control device that corresponds to the interactive event overlay. The screen may be a touch-screen that enables the user to interact with the remote control through the GUI. The remote control may communicate one or more signals to the display device in response to user input received by the remote control device from information provided through the GUI.

20 Claims, 14 Drawing Sheets

(51) Int. Cl.
*G06T 1/00* (2006.01)
*G06F 17/30* (2006.01)
*G06F 3/0484* (2013.01)
*H04N 21/442* (2011.01)
*H04N 21/4784* (2011.01)
*H04N 21/4722* (2011.01)
*H04N 21/478* (2011.01)
*H04N 21/441* (2011.01)
*H04N 21/81* (2011.01)
*H04N 21/435* (2011.01)
*H04N 21/00* (2011.01)

(52) U.S. Cl.
CPC .......... *H04N21/435* (2013.01); *H04N 21/441* (2013.01); *H04N 21/442* (2013.01); *H04N 21/478* (2013.01); *H04N 21/4722* (2013.01); *H04N 21/4784* (2013.01); *H04N 21/812* (2013.01)

(56) References Cited

U.S. PATENT DOCUMENTS

| | | | |
|---|---|---|---|
| 5,437,050 A | 7/1995 | Lamb et al. | |
| 5,712,995 A | 1/1998 | Cohn | |
| 5,874,686 A | 2/1999 | Ghias et al. | |
| 5,918,223 A | 6/1999 | Blum et al. | |
| 5,956,683 A | 9/1999 | Jacobs et al. | |
| 5,991,737 A | 11/1999 | Chen | |
| 6,121,530 A | 9/2000 | Sonoda | |
| 6,184,877 B1 | 2/2001 | Dodson et al. | |
| 6,201,176 B1 | 3/2001 | Yourlo | |
| 6,314,577 B1 | 11/2001 | Pocock | |
| 6,408,272 B1 | 6/2002 | White et al. | |
| 6,504,089 B1 | 1/2003 | Negishi et al. | |
| 6,556,218 B1 | 4/2003 | Alcorn | |
| 6,760,720 B1 | 7/2004 | De Bellis | |
| 6,765,595 B2 | 7/2004 | Lee et al. | |
| 6,834,308 B1 | 12/2004 | Ikezoye et al. | |
| 6,968,337 B2 | 11/2005 | Wold | |
| 6,990,453 B2 | 1/2006 | Wang et al. | |
| 7,080,325 B2 | 7/2006 | Treibach-Heck et al. | |
| 7,095,871 B2 | 8/2006 | Jones | |
| 7,134,132 B1 | 11/2006 | Ngo | |
| 7,174,293 B2 | 2/2007 | Kenyon et al. | |
| 7,190,971 B1 | 3/2007 | Kawamoto | |
| 7,194,752 B1 | 3/2007 | Kenyon et al. | |
| 7,266,343 B1 | 9/2007 | Yli-juuti et al. | |
| 7,363,278 B2 | 4/2008 | Schmelzer et al. | |
| 7,444,353 B1 | 10/2008 | Chen et al. | |
| 7,500,007 B2 | 3/2009 | Ikezoye et al. | |
| 7,529,659 B2 | 5/2009 | Wold | |
| 7,562,012 B1 | 7/2009 | Wold et al. | |
| 7,562,392 B1 | 7/2009 | Rhoads et al. | |
| 7,565,327 B2 | 7/2009 | Schmelzer | |
| 7,624,416 B1 | 11/2009 | Vandermolen | |
| 7,703,114 B2 | 4/2010 | Thukral | |
| 7,707,088 B2 | 4/2010 | Schmelzer | |
| 7,711,652 B2 | 5/2010 | Schmelzer | |
| 7,730,509 B2 | 6/2010 | Boulet et al. | |
| 7,747,749 B1 | 6/2010 | Erikson et al. | |
| 7,783,489 B2 | 8/2010 | Kenyon et al. | |
| 7,797,249 B2 | 9/2010 | Schmelzer et al. | |
| 7,813,954 B1 | 10/2010 | Price | |
| 7,870,574 B2 | 1/2011 | Kenyon et al. | |
| 7,877,290 B1 | 1/2011 | Arsenault | |
| 7,877,438 B2 | 1/2011 | Schrempp et al. | |
| 7,900,228 B2 | 3/2011 | Stark et al. | |
| 7,917,645 B2 | 3/2011 | Ikezoye et al. | |
| 8,006,274 B2 | 8/2011 | Scott, III | |
| 8,046,803 B1 | 10/2011 | Lee | |
| 8,117,635 B2 | 2/2012 | Hendricks et al. | |
| 8,249,422 B2 | 8/2012 | Narahara et al. | |
| 8,281,339 B1 | 10/2012 | Walker | |
| 8,335,833 B1 | 12/2012 | Parkinson | |
| 8,407,750 B2 | 3/2013 | Vorbau | |
| 8,413,206 B1 | 4/2013 | Wyatt et al. | |
| 8,418,206 B2 | 4/2013 | Bryant et al. | |
| 8,553,148 B2 | 10/2013 | Ramaswamy et al. | |
| 8,572,650 B2 | 10/2013 | Townsend et al. | |
| 8,732,473 B2 | 5/2014 | Bisso et al. | |
| 8,732,739 B2 | 5/2014 | Sillerman | |
| 8,793,274 B2 | 7/2014 | Yu et al. | |
| 8,810,512 B2 | 8/2014 | Andersson | |
| 2002/0032906 A1 | 3/2002 | Grossman | |
| 2002/0069100 A1 | 6/2002 | Arberman | |
| 2002/0073419 A1 | 6/2002 | Yen | |
| 2002/0078441 A1 | 6/2002 | Drake | |
| 2002/0083060 A1 | 6/2002 | Wang et al. | |
| 2002/0120925 A1 | 8/2002 | Logan | |
| 2002/0133817 A1 | 9/2002 | Markel | |
| 2002/0178447 A1 | 11/2002 | Plotnick | |
| 2003/0002638 A1 | 1/2003 | Kaars | |
| 2003/0035075 A1* | 2/2003 | Butler et al. | 348/734 |
| 2003/0055699 A1 | 3/2003 | O'Connor | |
| 2003/0056101 A1 | 3/2003 | Epstein | |
| 2003/0101451 A1 | 5/2003 | Bentolila | |
| 2003/0149975 A1 | 8/2003 | Eldering | |
| 2003/0154475 A1 | 8/2003 | Rodriguez | |
| 2003/0172381 A1 | 9/2003 | Janevski | |
| 2004/0003397 A1 | 1/2004 | Boston et al. | |
| 2004/0031046 A1 | 2/2004 | Weinblatt et al. | |
| 2004/0034874 A1* | 2/2004 | Hord et al. | 725/136 |
| 2004/0068737 A1 | 4/2004 | Itoh et al. | |
| 2004/0143349 A1* | 7/2004 | Roberts et al. | 700/94 |
| 2004/0143845 A1 | 7/2004 | Lin | |
| 2004/0189710 A1 | 9/2004 | Goulden | |
| 2004/0205810 A1 | 10/2004 | Matheny et al. | |
| 2004/0210847 A1 | 10/2004 | Berson | |
| 2004/0255322 A1 | 12/2004 | Meadows et al. | |
| 2005/0022211 A1 | 1/2005 | Veselov et al. | |
| 2005/0097599 A1 | 5/2005 | Plotnick et al. | |
| 2005/0149968 A1 | 7/2005 | Konig | |
| 2005/0235307 A1 | 10/2005 | Relan | |
| 2005/0278731 A1 | 12/2005 | Cameron | |
| 2006/0015923 A1 | 1/2006 | Chuah | |
| 2006/0026636 A1* | 2/2006 | Stark et al. | 725/37 |
| 2006/0031684 A1 | 2/2006 | Sharma et al. | |
| 2006/0187358 A1 | 8/2006 | Lienhart | |
| 2006/0195860 A1 | 8/2006 | Eldering | |
| 2006/0282847 A1 | 12/2006 | Gupte | |
| 2007/0078009 A1 | 4/2007 | Lockton | |
| 2007/0192784 A1 | 8/2007 | Postrel | |
| 2007/0250901 A1 | 10/2007 | McIntire | |
| 2008/0064490 A1 | 3/2008 | Ellis | |
| 2008/0104634 A1 | 5/2008 | Gajdos et al. | |
| 2008/0127253 A1 | 5/2008 | Zhang | |
| 2008/0227436 A1 | 9/2008 | Gantman | |
| 2008/0244640 A1 | 10/2008 | Belleguie | |
| 2008/0250447 A1 | 10/2008 | Rowe | |
| 2008/0300983 A1* | 12/2008 | Chen et al. | 705/14 |
| 2008/0305815 A1* | 12/2008 | McDonough | 455/466 |
| 2008/0310731 A1 | 12/2008 | Stojancic et al. | |
| 2008/0313140 A1 | 12/2008 | Pereira et al. | |
| 2009/0009532 A1 | 1/2009 | Hallberg | |
| 2009/0064261 A1 | 3/2009 | Jung | |
| 2009/0077046 A1 | 3/2009 | Narahara et al. | |
| 2009/0077489 A1 | 3/2009 | Homma | |
| 2009/0094637 A1 | 4/2009 | Lemmons | |
| 2009/0106104 A1 | 4/2009 | Upendran et al. | |
| 2009/0119723 A1 | 5/2009 | Tinsman | |
| 2009/0133049 A1 | 5/2009 | Bradley | |
| 2009/0150930 A1 | 6/2009 | Sherwin et al. | |
| 2009/0235317 A1 | 9/2009 | Igarashi | |
| 2009/0259690 A1 | 10/2009 | Bogdanov | |
| 2009/0288113 A1 | 11/2009 | Skinner | |
| 2009/0317053 A1 | 12/2009 | Morley | |
| 2009/0318114 A1 | 12/2009 | Bertoni | |
| 2009/0319522 A1 | 12/2009 | Karstens | |
| 2009/0327894 A1 | 12/2009 | Rakib | |
| 2010/0007797 A1 | 1/2010 | Stojancic | |
| 2010/0043040 A1 | 2/2010 | Olsen | |
| 2010/0095337 A1* | 4/2010 | Dua | 725/110 |
| 2010/0121691 A1 | 5/2010 | Shifflett et al. | |

(56) References Cited

U.S. PATENT DOCUMENTS

| | | | |
|---|---|---|---|
| 2010/0125498 A1 | 5/2010 | Jaramillo | |
| 2010/0158391 A1 | 6/2010 | Cunningham | |
| 2010/0162344 A1 | 6/2010 | Casagrande et al. | |
| 2010/0169906 A1 | 7/2010 | Takahashi | |
| 2010/0175078 A1 | 7/2010 | Knudson | |
| 2010/0205627 A1 | 8/2010 | Cesmedziev | |
| 2010/0205628 A1* | 8/2010 | Davis et al. | 725/25 |
| 2010/0242065 A1 | 9/2010 | Murakami | |
| 2010/0245681 A1* | 9/2010 | Harris | 348/734 |
| 2010/0269128 A1* | 10/2010 | Gordon | 725/25 |
| 2010/0303338 A1 | 12/2010 | Stojancic et al. | |
| 2010/0306193 A1 | 12/2010 | Pereira et al. | |
| 2010/0318515 A1 | 12/2010 | Ramanathan et al. | |
| 2010/0325135 A1 | 12/2010 | Chen et al. | |
| 2011/0067046 A1 | 3/2011 | Cox et al. | |
| 2011/0067066 A1 | 3/2011 | Barton | |
| 2011/0074679 A1* | 3/2011 | West et al. | 345/163 |
| 2011/0078729 A1 | 3/2011 | Lajoie et al. | |
| 2011/0078733 A1 | 3/2011 | Lee | |
| 2011/0088063 A1 | 4/2011 | Ben-Romdhane et al. | |
| 2011/0107363 A1 | 5/2011 | Sanghavi | |
| 2011/0122255 A1 | 5/2011 | Haritaoglu | |
| 2011/0177775 A1* | 7/2011 | Gupta et al. | 455/3.06 |
| 2011/0191806 A1 | 8/2011 | Knudson et al. | |
| 2011/0219419 A1* | 9/2011 | Reisman | 725/112 |
| 2011/0280434 A1 | 11/2011 | Mamidwar et al. | |
| 2011/0283322 A1 | 11/2011 | Hamano | |
| 2011/0283327 A1 | 11/2011 | Zhu | |
| 2011/0289098 A1 | 11/2011 | Oztaskent et al. | |
| 2011/0289114 A1* | 11/2011 | Yu et al. | 707/769 |
| 2011/0289524 A1* | 11/2011 | Toner et al. | 725/14 |
| 2011/0307931 A1 | 12/2011 | Shuster | |
| 2011/0311095 A1 | 12/2011 | Archer | |
| 2011/0313856 A1* | 12/2011 | Cohen et al. | 705/14.49 |
| 2011/0314491 A1 | 12/2011 | Delidais et al. | |
| 2011/0314495 A1 | 12/2011 | Zenor | |
| 2012/0017236 A1 | 1/2012 | Stafford et al. | |
| 2012/0042334 A1 | 2/2012 | Choi | |
| 2012/0054848 A1 | 3/2012 | Salowey et al. | |
| 2012/0079521 A1 | 3/2012 | Garg et al. | |
| 2012/0096491 A1 | 4/2012 | Shkedi | |
| 2012/0117584 A1 | 5/2012 | Gordon | |
| 2012/0124625 A1 | 5/2012 | Foote | |
| 2012/0144416 A1 | 6/2012 | Wetzer | |
| 2012/0167133 A1 | 6/2012 | Carroll | |
| 2012/0174157 A1* | 7/2012 | Stinson et al. | 725/40 |
| 2012/0174165 A1* | 7/2012 | Mondragon et al. | 725/75 |
| 2012/0185895 A1 | 7/2012 | Wong et al. | |
| 2012/0192227 A1 | 7/2012 | Fleischman | |
| 2012/0215789 A1 | 8/2012 | Ramanathan | |
| 2012/0246693 A1 | 9/2012 | Iqbal | |
| 2012/0303442 A1 | 11/2012 | Patwa | |
| 2012/0311618 A1* | 12/2012 | Blaxland | 725/9 |
| 2012/0317240 A1 | 12/2012 | Wang | |
| 2012/0331496 A1 | 12/2012 | Copertino | |
| 2013/0014146 A1 | 1/2013 | Bhatia et al. | |
| 2013/0019262 A1* | 1/2013 | Bhatia et al. | 725/34 |
| 2013/0047178 A1 | 2/2013 | Moon et al. | |
| 2013/0047180 A1* | 2/2013 | Moon et al. | 725/30 |
| 2013/0125163 A1 | 5/2013 | Chen et al. | |
| 2013/0132999 A1 | 5/2013 | Pandey | |
| 2013/0162902 A1 | 6/2013 | Musser | |
| 2013/0163957 A1 | 6/2013 | Ikizyan | |
| 2013/0167171 A1 | 6/2013 | Kitazato et al. | |
| 2013/0174191 A1* | 7/2013 | Thompson et al. | 725/23 |
| 2013/0198768 A1* | 8/2013 | Kitazato | 725/19 |
| 2013/0205315 A1 | 8/2013 | Sinha et al. | |
| 2013/0205316 A1 | 8/2013 | Sinha et al. | |
| 2013/0205318 A1 | 8/2013 | Sinha et al. | |
| 2013/0205319 A1 | 8/2013 | Sinha et al. | |
| 2013/0205335 A1 | 8/2013 | Sinha et al. | |
| 2013/0208942 A1 | 8/2013 | Davis | |
| 2013/0222597 A1 | 8/2013 | Brink | |
| 2013/0239163 A1 | 9/2013 | Kim et al. | |
| 2013/0305335 A1 | 11/2013 | Syed et al. | |
| 2013/0332951 A1 | 12/2013 | Gharaat | |
| 2013/0339999 A1 | 12/2013 | Sangiovanni | |
| 2014/0028915 A1* | 1/2014 | Kim et al. | 348/518 |
| 2014/0082659 A1 | 3/2014 | Fife | |
| 2014/0089815 A1 | 3/2014 | Gildfind et al. | |
| 2014/0307931 A1 | 3/2014 | Shuster | |
| 2014/0150022 A1 | 5/2014 | Oh | |
| 2014/0164994 A1 | 6/2014 | Myslinski | |

FOREIGN PATENT DOCUMENTS

| | | |
|---|---|---|
| JP | 11055201 | 2/1999 |
| WO | WO9517746 | 6/1995 |

OTHER PUBLICATIONS

Blackburn, Steven G., "Search by Humming," University of Southampton Faculty of Engineering, Department of Electronics and Computer Science, May 8, 1997.

Ghias, Asif et al, "Query By Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call *CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

* cited by examiner

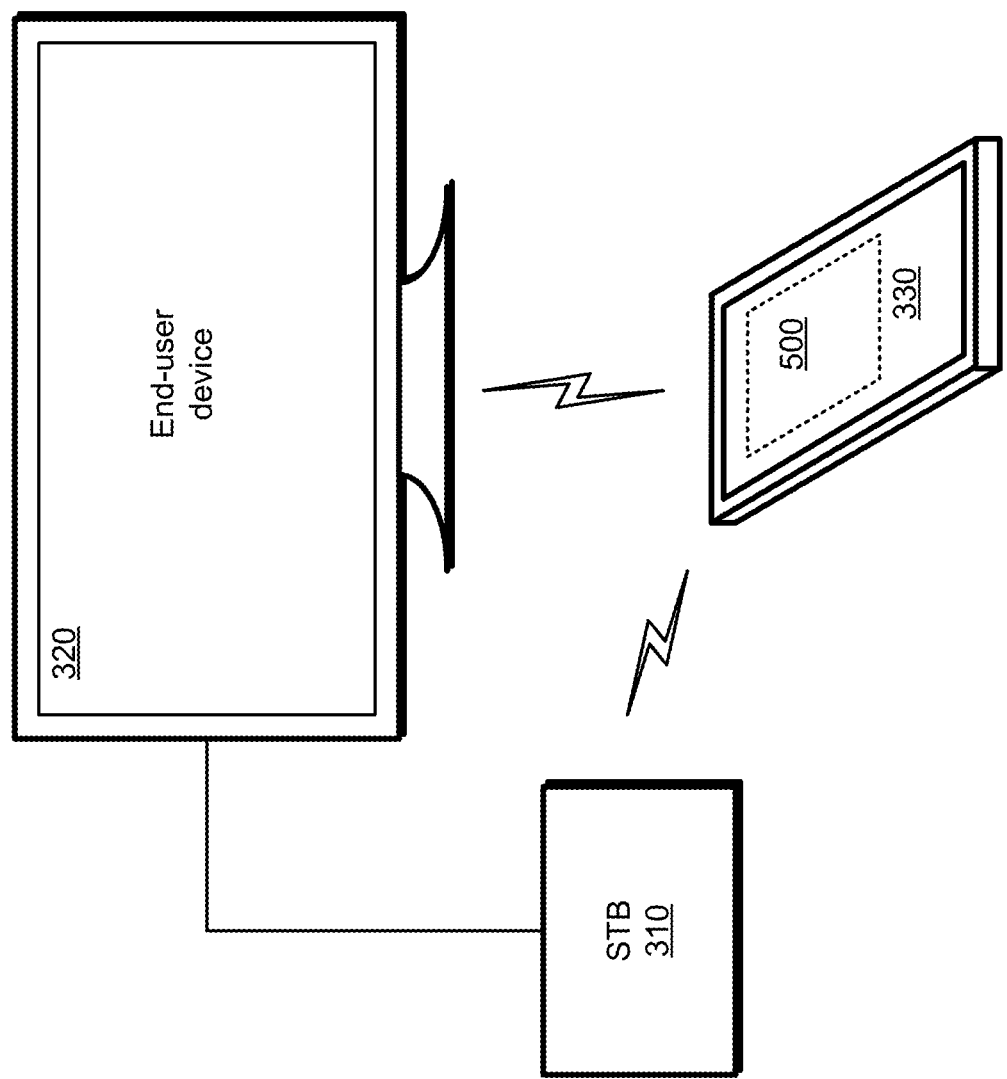

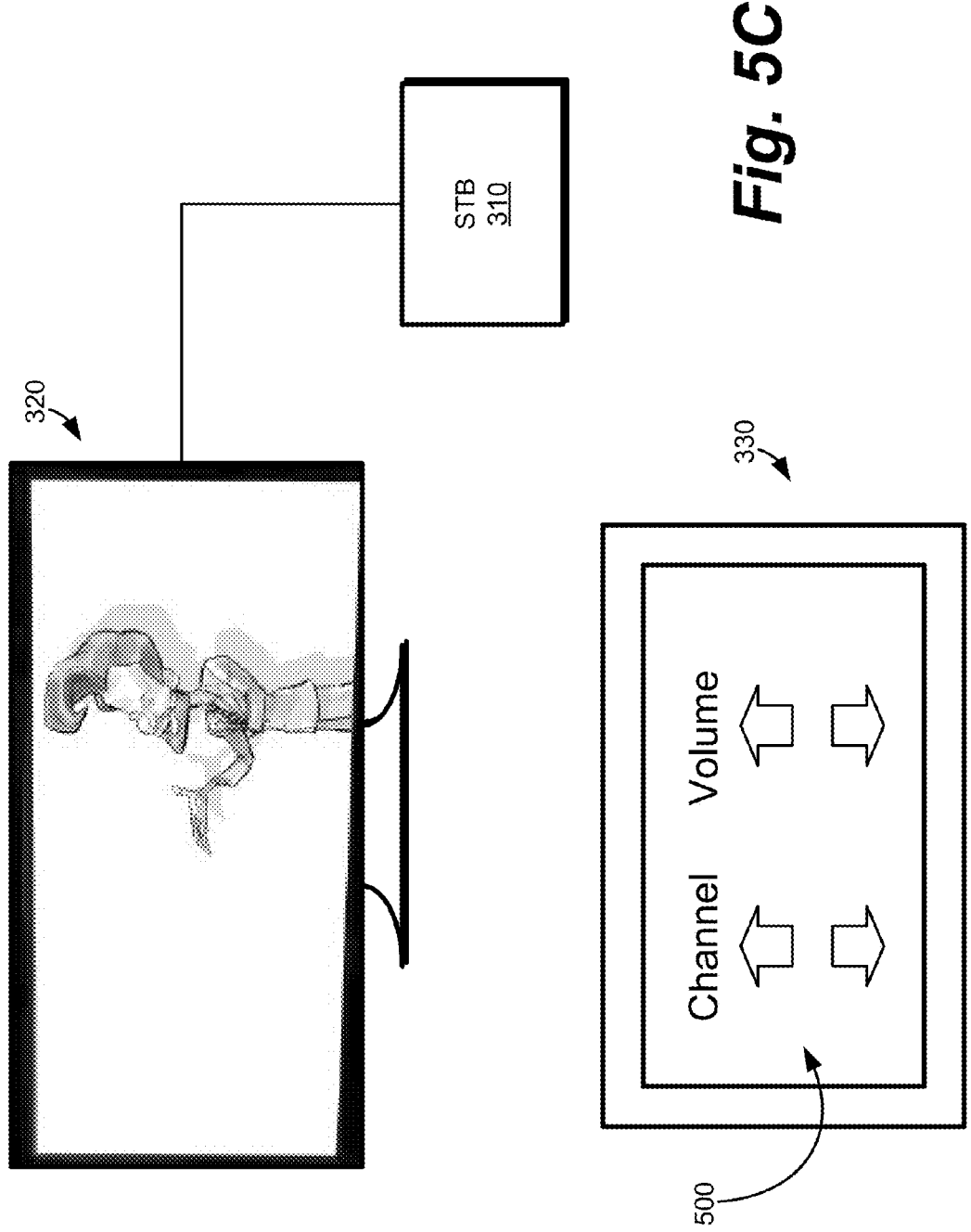

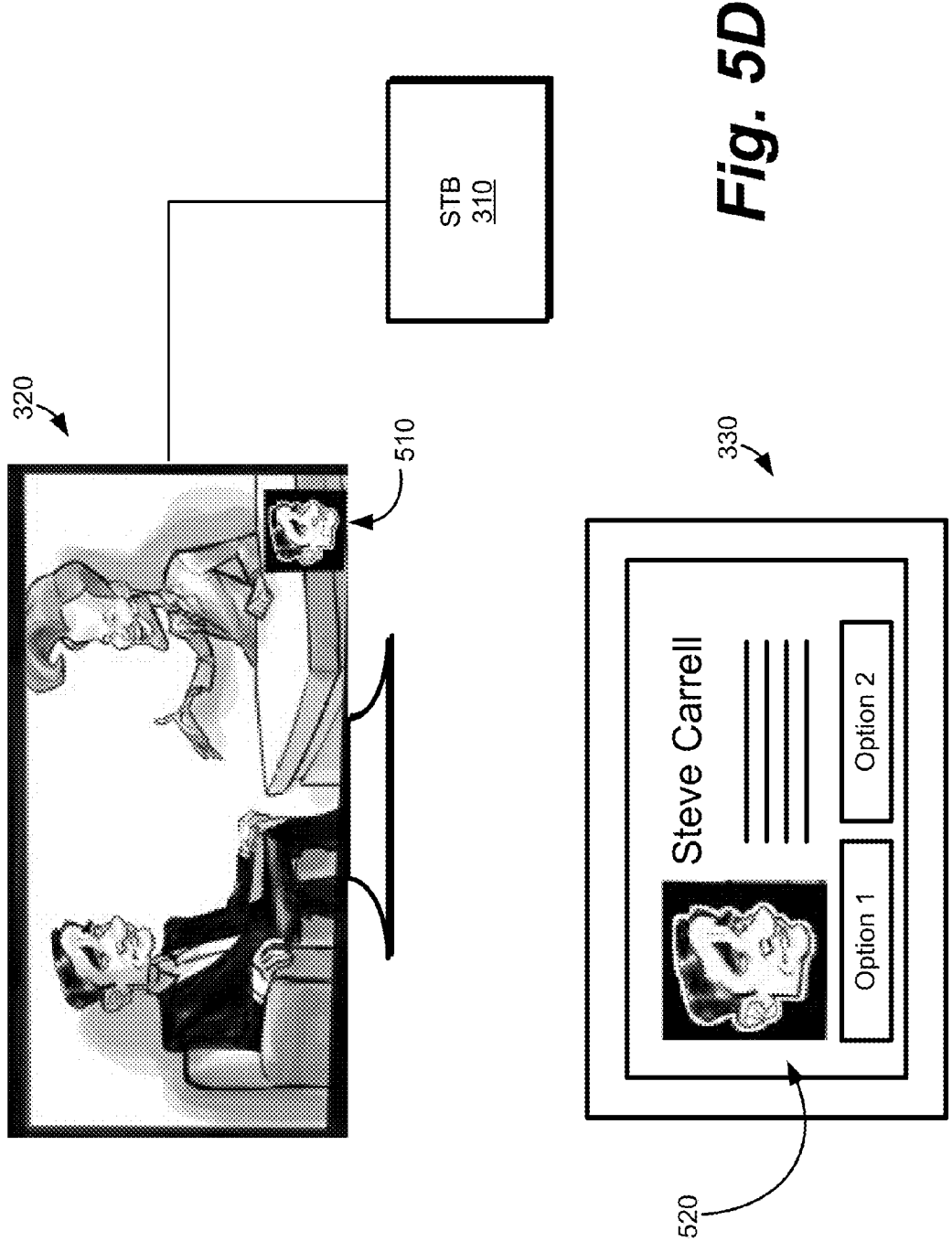

ial application 61/596,012,
METHOD AND SYSTEM FOR A UNIVERSAL REMOTE CONTROL

CROSS-REFERENCE TO RELATED APPLICATIONS/INCORPORATION BY REFERENCE

This application makes reference to, claims priority to, and claims the benefit of U.S. provisional application 61/596,012, filed on Feb. 7, 2012.

U.S. patent application Ser. No. 13/730,359 filed on Dec. 28, 2012;

U.S. patent application Ser. No. 13/730,422 filed on Dec. 28, 2012;

U.S. patent application Ser. No. 13/730,459 filed on Dec. 28, 2012;

U.S. patent application Ser. No. 13/730,495 filed on Dec. 28, 2012;

U.S. patent application Ser. No. 13/730,530 filed on Dec. 28, 2012;

U.S. patent application Ser. No. 13/730,754 filed on Dec. 28, 2012;

U.S. patent application Ser. No. 13/730,559 filed on Dec. 28, 2012; and

U.S. patent application Ser. No. 13/730,579 filed on Dec. 28, 2012;

U.S. patent application Ser. No. 13/730,593 filed on Dec. 28, 2012;

U.S. patent application Ser. No. 13/730,759 filed on Dec. 28, 2012;

U.S. patent application Ser. No. 13/730,644 filed on Dec. 28, 2012;

U.S. patent application Ser. No. 13/730,656 filed on Dec. 28, 2012;

U.S. patent application Ser. No. 13/730,670 filed on Dec. 28, 2012;

U.S. patent application Ser. No. 13/730,691 filed on Dec. 28, 2012;

U.S. patent application Ser. No. 13/730,702 filed on Dec. 28, 2012; and

U.S. patent application Ser. No. 13/730,718 filed on Dec. 28, 2012; and

U.S. patent application Ser. No. 13/730,734 filed on Dec. 28, 2012.

Each of the above referenced applications is hereby incorporated herein by reference in its entirety.

FIELD OF TECHNOLOGY

Certain embodiments of the invention relate to smart televisions. More specifically, certain embodiments of the invention relate to a method and system for a universal remote control.

BACKGROUND

Smart or connected televisions (TVs) may receive data from data networks such as Internet networks that allow a viewer to not only access broadcast digital content, but also receive multimedia content. In addition viewers without Smart TVs can access additional content via a smart phone or tablet. With the proliferation of connected TVs and wireless communication devices such as smartphones and tablets, content or network providers now have a plethora of avenues for distributing media including programming, advertisements and interactive content.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a universal remote control, substantially as shown in and/or described in accordance with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 5A-5D are each diagrams that illustrate an exemplary change in operating mode in a universal remote control when an interactive event overlay is displayed on a display device, in accordance with an embodiment of the invention.

DETAILED DESCRIPTION OF THE INVENTION

Figure 1:
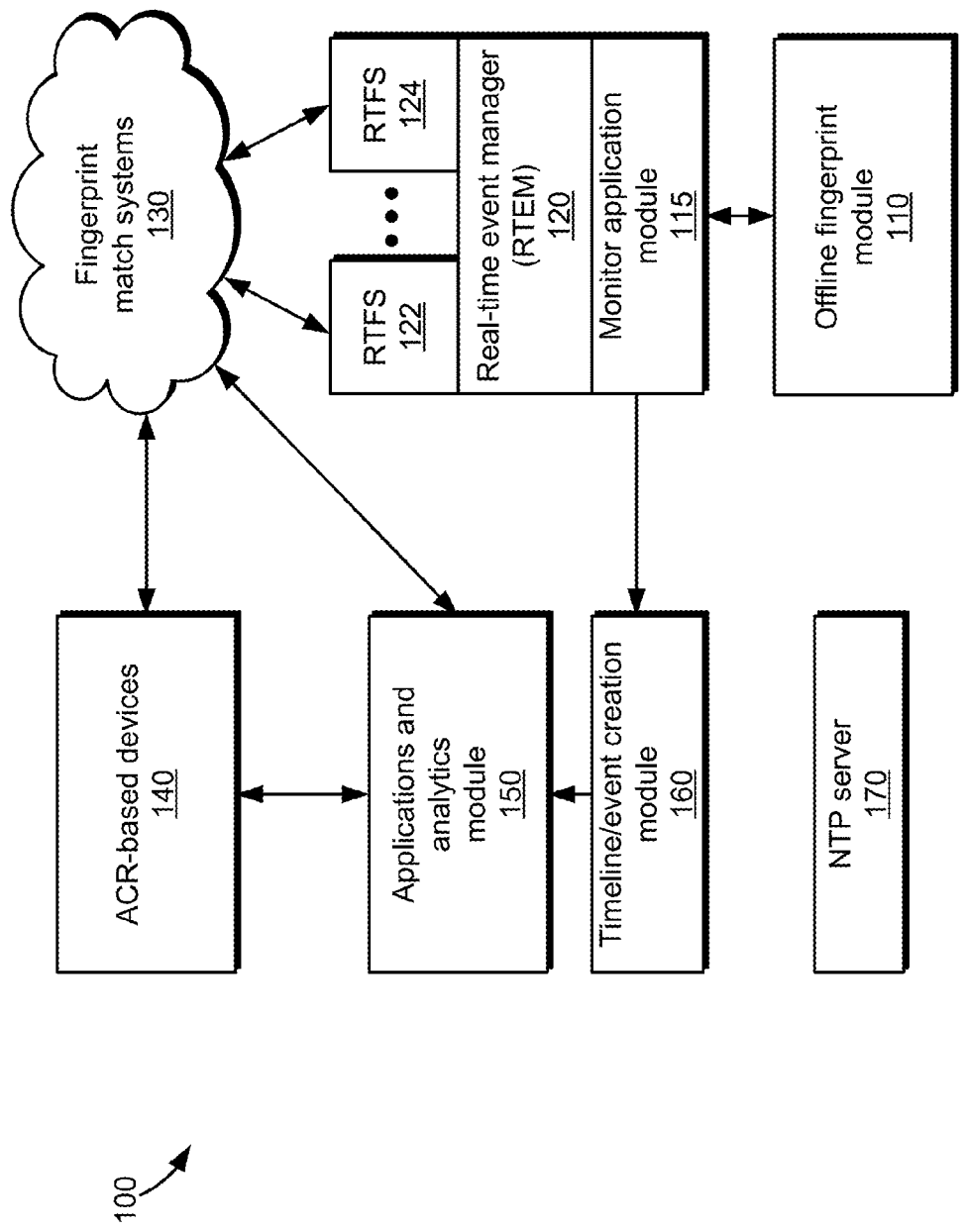
FIG. 1 is a high-level block diagram that illustrates an exemplary automatic content recognition system, in accordance with an embodiment of the invention.

Certain embodiments of the invention may be found in a method and system for a universal remote control. The universal remote control may be operable to control one or more devices, including but not limited to, display devices that support automatic content recognition (ACR). ACR may be utilized in systems to assign interactive events to specific portions of video content to enable user participation with the video content being presented by, for example, a display device. A display device may refer to a connected or smart television (TV) or other like device that a user may utilize to watch video content. In various embodiments of the invention, the universal remote control may be paired to the display device.

The universal remote control, which may also be referred simply as a remote control or remote control device, may receive a trigger signal from the display device that corresponds to an interactive event overlay that is displayed on the display device as a result of the ACR operations. The pairing between the remote control device and the display device may occur through the exchange or use of near field communication (NFC) protocol signals and/or WiFi signals, for example. Once the trigger signal is received, a graphical user interface (GUI) may be generated for display on a screen of the remote control device. The GUI displayed on the screen of the remote control may correspond to the interactive event overlay displayed on the display device. The screen may be a touchscreen that enables the user to interact with the remote control by touching the icons, buttons, selections, gestures and/or other graphical images that are presented on the GUI. The remote control may communicate one or more signals to the display device in response to user input received by the remote control device from the information that is presented to the user through the GUI.

In some embodiments of the invention, the universal remote control may generate a default GUI to enable interaction with the display device and/or with another device such as a set-top box (STB) and/or a home theater system. In response to a trigger signal corresponding to an interactive event overlay, the universal remote control may replace the default GUI with another GUI that enables the user to carry out the desired interaction with the appropriate device. In this manner, the user need not have one remote control that controls the operations of a set-top box, for example, and another remote control that controls the operations of a connected TV. Instead, the user may utilize a single device to control the set-top box functionality and to participate with the interactive events presented to the user in the form of a graphical overlay on the connected TV. The information that is necessary for a particular GUI to be generated and/or displayed on a screen of the universal remote control may be at least partially received by the universal remote control from the display device.

The universal remote control may be operable to change between different modes of operation based on whether an interactive event is taking place and/or based on the type of interactive event. For each of these modes of operation a corresponding GUI may be generated and displayed that enables the user to participate in the interactive event or interactive opportunity that corresponds to that particular mode. In some instances, the same GUI may be utilized to support different modes of operations.

For the ACR systems described herein, fingerprinting may refer to a process by which features of a video frame and/or of an audio frame may be analyzed to create representations (i.e., fingerprints) for each piece of content, for example. The fingerprints may be unique to each piece or sequence of content and may be highly robust against broadcast distortions such as re-encoding, aspect ratio, frame rate, up/down conversion, and pitch correction, to name a few. The fingerprints may be stored in a reference database in an ACR system such that unidentified content (e.g., content from a network television feed) may be identified by comparing fingerprints taken of the unidentified content with the stored fingerprints.

Event identifiers, which indicate interactive events for user participation, may be assigned by a network time protocol server while real-time fingerprint servers may communicate the video fingerprints and the assigned event identifiers to corresponding fingerprint match systems. In some instances, the fingerprint match systems may be operated by a third party (e.g., television manufacturers, vendors etc.) as hosted services over the Internet (e.g., cloud computing, etc.). Each of the fingerprint match systems may communicate with devices (e.g., connected TVs, tablets, smartphones, etc.) that utilize the same video fingerprint technology utilized by the fingerprint server that corresponds to that fingerprint match system. These devices may be referred to as viewer devices, display devices, or end-user devices, for example.

The fingerprint match systems receive video and/or audio fingerprints from the display devices and compare them to the ones received from the real-time fingerprint servers. When a match occurs, the fingerprint match systems may notify the end-user or display devices that an interactive event is to take place if there is an event identifier that corresponds to the matched fingerprints. When an event is to take place, the display device may be operable to generate and/or display a graphical overlay that it may display concurrently with the corresponding video content. Once a user is presented with the graphical overlay to indicate that an interactive event is available, a universal remote control may be operated to enable the user to interact with the display device to participate in the interactive opportunity being presented.

The automatic content recognition described herein may be utilized across several platforms, including connected TVs from various manufacturers as well as smartphones and tablets. Since television viewing may be rapidly evolving from a single-screen experience to a multiple-screen experience, television networks may need to automatically identify the context of what a viewer is watching and the time in the program, both during a live television broadcast and in subsequent viewings such as when a program is being reproduced by a digital video recorder (DVR). In multi-screen viewing experiences, for example, companion applications on second-screen devices may also be utilized to interact with the television programming.

Having the ability to identify context and program timing may enable a network to increase audience engagement, extend viewing times, and provide program sponsors additional ways to engage with the audience, such as offering viewers personalized advertising offers or creating a second-screen experience during an advertisement break. These features may be implemented by having a central video fingerprint repository and management platform that facilitates triggering interactive events across various platforms regardless of the ACR vendor solution (e.g., fingerprinting technology). For example, an ACR system may utilize a single broadcast ACR solution to support connected TVs from multiple vendors as well as second-screen devices running companion applications. Such a system may be scalable and additional ACR vendor solutions may be added. Moreover, such as system may handle both real-time and pre-recorded (offline) content.

Below are described various examples of aspects related to a system that supports ACR operations. These exemplary aspects may comprise the system architecture, processes, application programming interfaces (APIs), and/or web-based services. The system may enable the user to participate in interactive opportunities that are presented in connected TVs or other like devices. A user may interact with the connected TV by utilizing a universal remote control that provides the appropriate graphical and/or functional information for each interactive opportunity. For example, the universal remote control may provide a GUI with appropriate selections, options, responses, actions, choices, and/or navigational tools (e.g., up, down, left, right arrows), which enable a user to respond to different types of interactive opportunities such as trivia questions, games, polls, user preferences, content selection, and the like.

FIG. 1 is a high-level block diagram that illustrates an exemplary automatic content recognition system, in accordance with an embodiment of the invention. Referring to FIG. 1, there is shown an ACR system 100 that is operable to enable the presentation or display of interactive opportunities for viewer participation. For example, various interactive events may be synchronized to certain video content and may be presented to viewers in the form of graphical overlays. The viewers may then participate in the interactive opportunities by utilizing a remote control that enables the viewer to provide input such as selections, choices, and/or some other information that may be communicated to the device in which the content is being displayed.

The ACR system 100 may comprise an offline fingerprint module 110, a monitor application module 115, a real-time event manager (RTEM) 120, a plurality of RTFSs 122, ..., 124, fingerprint match systems 130, end-user devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, ..., 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 ... 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

In an embodiment of the invention, the Real-time event manager 120 may be operable to generate one or more signals that provide instructions to the RTFSs 122, ..., 124 to enable the identification of a network television station based on the logo, symbol, sign, watermark, and/or text that are typically utilized to represent the network television station. The instructions may be related to information that is to be generated and/or provided to the end-user devices 140 for network television station identification. The instructions may indicate the type of information that is to be provided to the end-user devices 140 and/or when such information is to be provided. In some instances, a portion of the ACR system 100 other than the Real-time event manager 120, or in conjunction with the Real-time event manager 120, may generate the signals for providing instructions to the RTFSs 122, ..., 124.

The RTFSs 122, ..., 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, ..., 124 may be a dedicated server for each of the fingerprint technologies supported by the ACR system 100. In some embodiments of the invention, a portion of the RTFSs 122, ..., 124 may be operable to perform video fingerprinting while the remaining portion of the RTFSs 122, ..., 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

In an embodiment of the invention, the RTFSs 122, ..., 124 may be operable to receive one or more signals from the Real-time event manager 120 and/or from another portion of the ACR system 100 to enable the identification of a network television station based on the logo, symbol, sign, watermark, and/or text that are typically utilized to represent the network television station. The instructions may be utilized to determine and/or provide locations to the end-user devices 140 to take fingerprints of the video content being displayed on a viewing screen. In some instances, at least a portion of the fingerprinting locations may be provided by the Real-time event manager 120 and/or by another portion of the ACR system 100 through the instructions received by the RTFSs 122, ..., 124. In other instances, the fingerprinting locations may be determined by the RTFSs 122, ..., 124 based on locally and/or remotely stored information. Each fingerprinting location may comprise coordinates in a video frame (e.g., x coordinates, y coordinates) that indicate a particular region in the video frame to fingerprint.

The RTFSs 122, ..., 124 may provide the fingerprinting locations for communication to the end-user devices 140, for example, in the form of fingerprint profiles. The fingerprint profiles may comprise fingerprinting locations and/or other information to be utilized by an end-user device for ACR fingerprinting. In some instances, the fingerprint profiles may be generated by the RTFSs 122, ..., 124 in response to the instructions received. In other instances, the fingerprint profiles comprising the fingerprinting locations may be received by the RTFSs 122, ..., 124 from the Real-time event manager 120 and/or from another portion of the ACR system 100. The fingerprint profile of a particular end-user device 140 may be updated based on an indication that additional and/or different locations may be needed during fingerprinting to identify the network television station logo or symbol being displayed on a viewing screen at the end-user device 140. The update may be generated by the corresponding RTFS and then communicated to the end-user device 140 or may be received by the corresponding RTFS from the Real-time event manager 120 and/or from another portion of the ACR system 100 and then communicated to the end-user device 140.

The indication that a fingerprint profile update may be needed may be the result of network operations that recognize that certain content is being broadcast by several network television stations concurrently (e.g., State of the Union address). In such instances, the fingerprinting locations being utilized may not analyze the region in a video frame where the logo of the network television station is displayed. Thus, providing additional fingerprinting locations in this region may enable detection and identification of the logo and, consequently, of the network television station.

The indication that a fingerprint profile update may be needed may also be the result of feedback provided by an end-user device 140. The feedback may indicate, for example, that the content being displayed has been identified but that the content may have originated in any one of several sources and the particular source of the content has not been identified. In such instances, the fingerprinting locations being utilized may not analyze the region in a video frame where the logo of the network television station is displayed. Thus, providing additional fingerprinting locations in this region may enable detection and identification of the logo and, consequently, of the source of the content.

In some instances, the fingerprint profile and/or the fingerprint profile update received by an end-user device may comprise information that indicates to the end-user device that any additional fingerprinting locations may be utilized automatically when the source (e.g., network television station) of a particular content is not initially identified.

In one or more embodiments of the invention, the RTFSs 122, ..., 124 may be operable to communicate fingerprint profiles and/or fingerprint profile updates to the end-user devices 140 through the fingerprint match systems 130. Feedback and/or queries from the end-user devices 140 may be received by the RTFSs 122, ..., 124 for processing. The RTFSs 122, ..., 124 may in turn communicate information corresponding to the feedback and/or queries from the end-user devices 140 to the Real-time event manager 120 and/or to another portion of the ACR system 100 for further processing.

The fingerprint match systems 130 may comprise suitable logic, circuitry, code, and/or interfaces that may be operable to enable hosted services in the Internet for matching fingerprints produced by the RTFSs 122, ..., 124 with fingerprints produced by the end-user devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the end-user devices 140 with fingerprints provided by the RTFSs 122, ..., 124. When matches occur, the fingerprint match systems 130 may indicate that interactive events are to take place in the end-user devices 140. These interactive events may allow a viewer to be presented with information on the screen or display of an ACR-based device and to interact with the device based on the information presented.

The end-user devices 140 may comprise a plurality of devices such as connected TVs, connected TV with paired devices (e.g., tablets), and second screen devices such as smartphones and tablets, for example. The ACR-based devices may be referred to as end-user devices, for example. Since each of the fingerprint match systems 130 supports a different ACR or fingerprint technology, those end-user devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The end-user devices 140 may be operable to receive and utilize a fingerprint profile and/or a fingerprint profile update and to take fingerprints in a pre-determined number of locations in a video frame. Each fingerprinting location may be defined by a set of coordinates that describe a region in the video frame where a fingerprint of the video content is to be taken. The end-user devices 140 may be operable to receive a series of fingerprint profiles and/or fingerprint profile updates and may be operable to adjust ACR fingerprinting accordingly.

In some embodiments of the invention, an end-user device 140 may be paired to a remote control (not shown) to enable a user to interact with the end-user device 140 through the remote control. The remote control may support one or more than one pairing technique. For example, the remote control may be paired to the end-user device 140 by utilizing NFC protocol signals and/or WiFi signals. The remote control may be a universal remote control that may be operable to control the operations of the end-user device 140 and of one or more additional devices. The remote control may be operable to present the user with a GUI that provides graphical information that corresponds to the interactive event being presented to the user by the end-user device 140. When an interactive event is not being presented, the GUI may be a default GUI with general controls or functionality. When an interactive event is being presented, the GUI may change and may comprise graphical and/or functional information that is enhanced and/or may be different from that provided by the default or standard GUI.

The applications and analytics module 150 may comprise suitable logic, circuitry, code, and/or interfaces that may be operable to provide data to the end-user devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate End-user devices 140 that may not support event-to-fingerprint association. Once the End-user devices 140 have the timeline for a particular program or show, they may monitor the program or show, relative to the timeline, and launch appropriate event requests when a specified point in the timeline indicates that a particular event is to take place.

Communication between the RTFSs 122, . . . , 124, and the fingerprint match systems 130 may occur through one or more wireless and/or wireline communication links. Similarly, communications between the fingerprint match systems 130 and the end-user devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, . . . , 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, . . . , 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, . . . , 124 may communicate the event identifiers and the fingerprints to its corresponding one of the fingerprint match systems 130. The fingerprint match systems 130 in turn receive fingerprints from their corresponding end-user devices 140 and try to match those fingerprints to the ones received from their corresponding RTFSs 122, . . . , 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event. The interactive information may be displayed by the end-user device 140 and a universal remote control may be utilized by a user to interact with the end-user device 140 in response to the interactive information displayed. There may be other actions performed by the user in connection with the interactive event and/or other information presented or produced in connection with the interactive event.

In operation, the ACR system 100 may generate a fingerprint profile that may be communicated to one of the end-user devices 140. The fingerprint profile may be communicated through one or more of the Real-time event manager 120, one of the RTFSs 122, . . . , 124, and one of the fingerprint match systems 130. The fingerprint profile may comprise locations where the end-user device is to take fingerprints of the video content being reproduced by the device. Once the content is identified based on the fingerprints taken and subsequently matched in the corresponding fingerprint match system 130, it may be determined that the source of the content is not known. Knowing the source of the content may be needed in some instances to enable interactive events associated with that source on the end-user device. Otherwise, an interactive event from, for example, one network television station may occur when a viewer is watching programming provided by a different network television station.

When the source of the content is not known, the end-user device may automatically utilize additional locations provided in the fingerprint profile or in a fingerprint profile update. These locations may correspond to the region in the video frame where the network television station logo or symbol is typically placed. Once these fingerprints are taken, they may be compared to fingerprints of the network television station logo or symbol at the corresponding fingerprint match systems 130. When a match occurs and the logo is identified, the end-user device may be able to receive interactive event identifiers from the corresponding RTFS. Once these interactive event identifiers are received, the end-user device may communicate with the applications and analytics module 150 to enable the interactive events to occur.

Figure 2A:
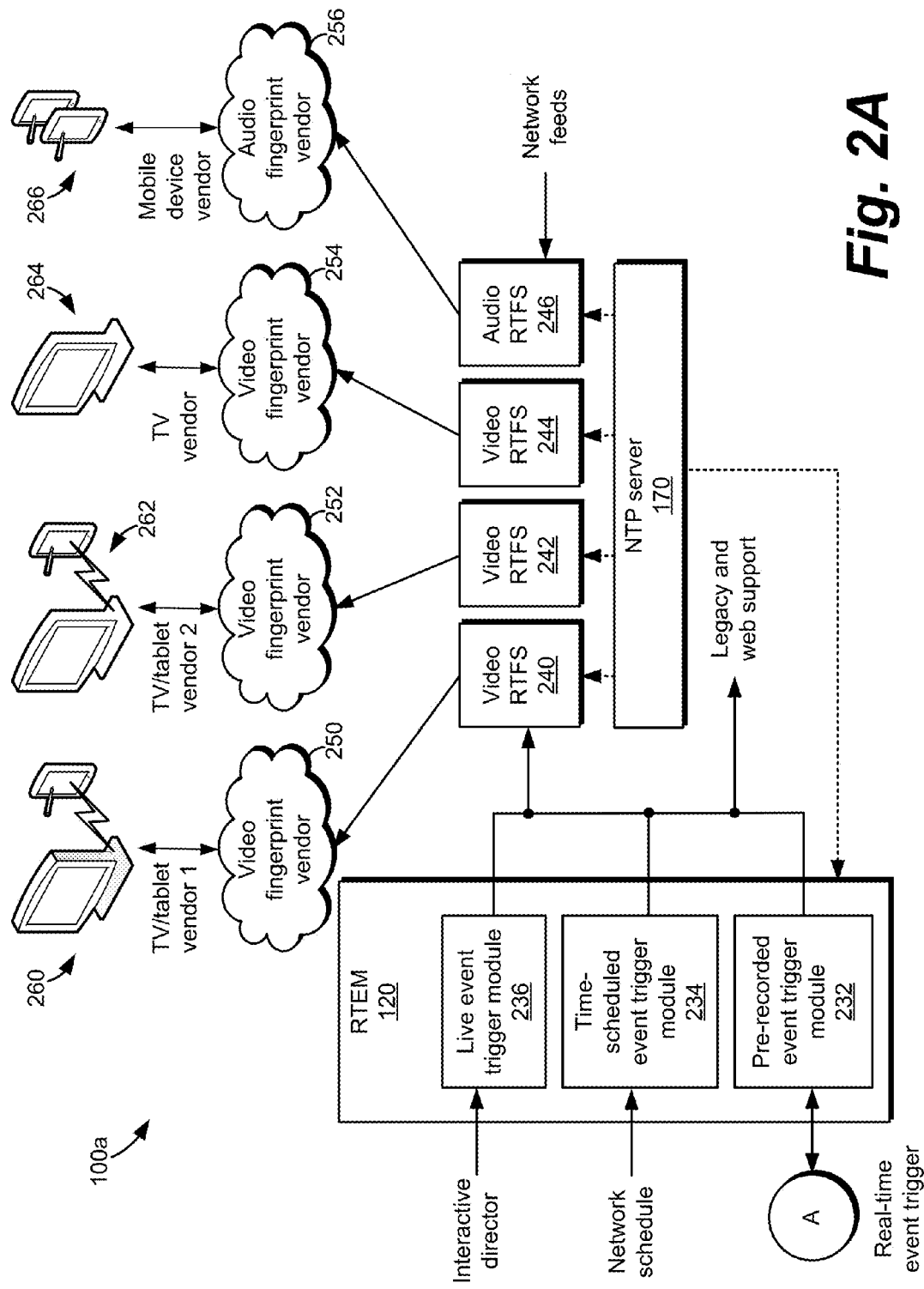
FIGS. 2A and 2B are each a block diagram that illustrates details of the exemplary automatic content recognition system utilized shown in FIG. 1, in accordance with embodiments of the invention.
Figure 2B:
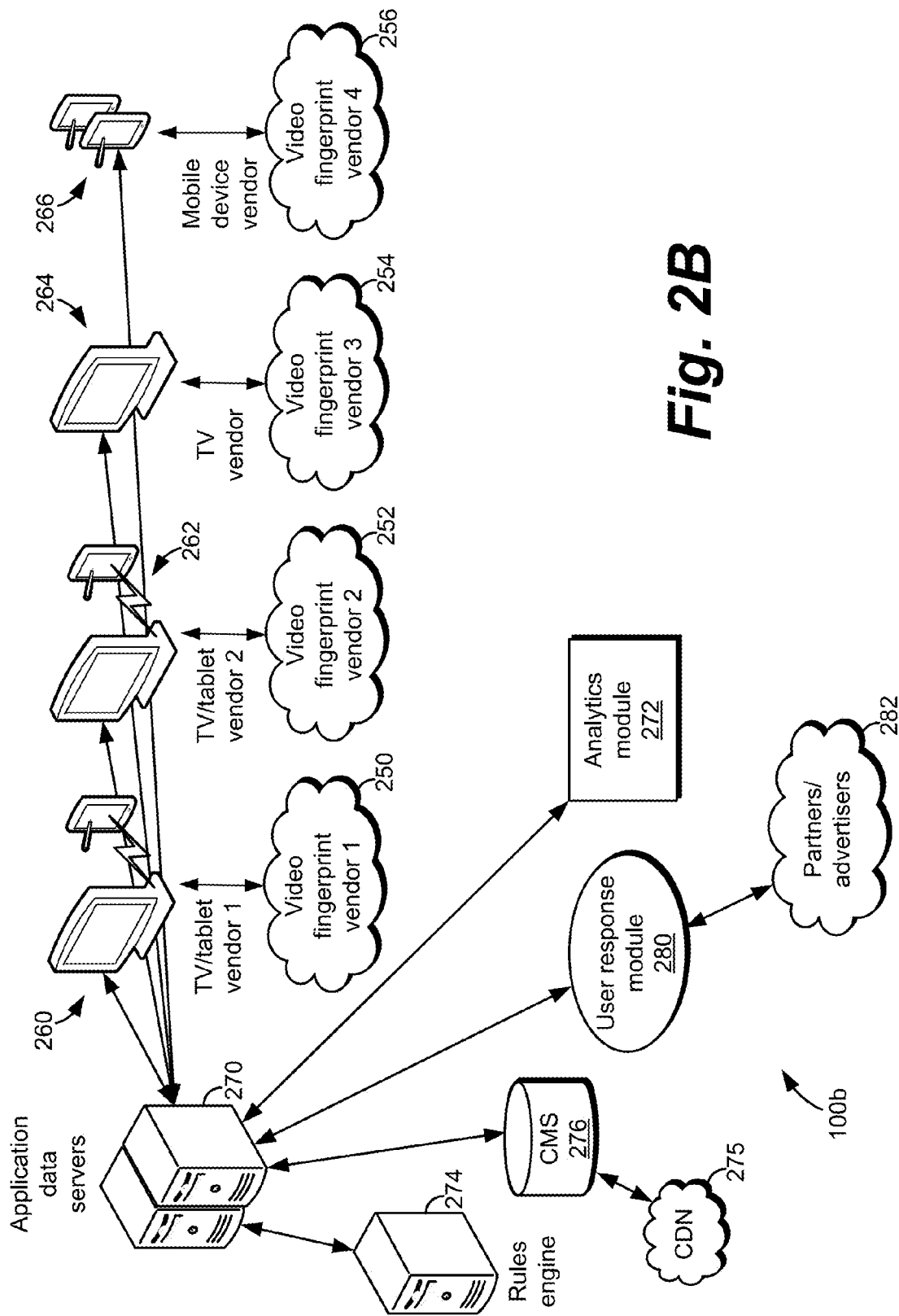

FIGS. 2A and 2B are each a block diagram that illustrates details of the exemplary automatic content recognition system shown in FIG. 1, in accordance with embodiments of the invention. Referring to FIG. 2A, there is shown a portion 100*a* of the ACR system 100 shown above with respect to FIG. 1 that may comprise the RTEM 230, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2A are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2A. The NTP server 170 of FIG. 1 is shown providing reference timing to the RTEM 230 and the RTFSs 240, 242, 244, and 246.

Also shown in FIG. 2A are various end-user devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example. The end-user devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the end-user devices 260. These services may comprise video fingerprint matching as well as the delivery of any interactive event IDs associated with a match. The services may also comprise the communication of fingerprint profiles and/or other related information to the end-user devices 260 and/or the reception of feedback and/or queries from the end-user devices 260 to be communicated to the video RTFS 240. In addition, the video fingerprint vendor 250 may provide a network television station identifier and/or network timing information (e.g., heartbeat message or NTP-based network timestamp) that may be utilized by the end-user devices 260 for ACR-related applications and/or to maintain synchronization with the network television feed. The end-user devices 260 may comprise suitable logic, circuitry, code, and/or interfaces that may be operable to take and send video fingerprints to the video fingerprint vendor 250 for matching.

The end-user devices 262 may be operable to utilize the same video fingerprinting technology utilized by the video RTFS 242 and supported by the video fingerprint vendor 252. The video fingerprinting technology utilized by the end-user devices 262 may be different from that utilized by the end-user devices 260. The video fingerprint vendor 252 may be a vendor, manufacturer, or other third-party service provider that may comprise suitable logic, circuitry, code, and/or interfaces operable to provide hosted services over the internet for the end-user devices 262. These services may comprise video fingerprint matching as well as the delivery of any interactive event IDs associated with a match. The services may also comprise the communication of fingerprint profiles and/or other related information to the end-user devices 262 and/or the reception of feedback and/or queries from the end-user devices 262 to be communicated to the video RTFS 242. In addition, the video fingerprint vendor 252 may provide a network television station identifier and/or network timing information that may be utilized by the end-user devices 262 for ACR-related applications and/or to maintain synchronization with the network television feed. The end-user devices 262 may comprise suitable logic, circuitry, code, and/or interfaces that may be operable to take and send video fingerprints to the video fingerprint vendor 252 for matching.

The end-user devices 260 and 262 may be operable to communicate with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality.

The end-user devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the end-user devices 264. These services may comprise video fingerprint matching as well as the delivery of any interactive event IDs associated with a match. In addition, the video fingerprint vendor 254 may provide a network television station identifier and/or network timing information that may be utilized by the end-user devices 264 for ACR-related applications and/or to maintain synchronization with the network television feed. The end-user devices 264 may comprise suitable logic, circuitry, code, and/or interfaces that may be operable to take and send video fingerprints to the video fingerprint vendor 254 for matching.

The end-user devices 266 may utilize the same audio fingerprinting technology (e.g., audio ACR) utilized by the audio RTFS 246 and supported by the audio fingerprint vendor 256. The end-user devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the end-user devices 266. These services may comprise audio fingerprint matching as well as the delivery of any interactive event IDs associated with a match. The services may also comprise the communication of audio fingerprint profiles and/or other related information to the end-user devices 266 and/or the reception of feedback and/or queries from the end-user devices 266 to be communicated to the audio RTFS 246. Audio fingerprint profiles may comprise information related to the characteristics (e.g., segments, frequencies) of the audio fingerprints to be taken by the end-user devices 266. In addition, the audio fingerprint vendor 256 may provide a network television station identifier and/or network timing information that may be utilized by the end-user devices 260 for ACR-related applications and/or to maintain synchronization with the network television feed. The end-user devices 266 may comprise suitable logic, circuitry, code, and/or interfaces that may be operable to take and send audio fingerprints to the audio fingerprint vendor 256 for matching.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding end-user devices. The RTFSs 240, . . . , 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTFSs 240, . . . , 246 may be operable to handle instructions and/or information that enable the identification of a network television station based on the logo, symbol, sign, watermark, and/or text that are typically utilized to represent the network television station. In this regard, the RTFSs 240, . . . , 246 may be operable to handle instructions and/or information as described above with respect to the RTFSs 122, . . . , 124 that are illustrated in FIG. 1, for example.

The RTEM 230 may comprise suitable logic, circuitry, code, and/or interfaces that may be operable to perform real-time event triggering. In this regard, the RTEM 230 may be operable to manage real-time events based on inputs from different sources. For example, the RTEM 230 may comprise a pre-recorded event trigger module 232 to provide real-time triggering from the monitor application module 115 (shown in FIG. 1), a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via, for example, defined APIs to fingerprints generated as the network television feeds are fingerprinted by the RTFSs 240, . . . , 246.

The time-scheduled event trigger module 234 may be operable to receive a network or broadcast schedule and to assign, based on the network schedule, interactive events to fingerprints generated as the network television feed is fingerprinted by the RTFSs 240, . . . , 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 230 may also be operable to trigger interactive events in legacy television systems and/or in web-based systems. The infrastructure provided by the RTEM 230 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 230 may be operable to assign interactive event IDs to particular fingerprints in a sequence of audio or video fingerprints generated by the RTFSs 240, . . . , 246. The RTEM 230 may also be operable to provide television network station identifiers and/or network timing information associated with any sequence of fingerprints.

In the example shown in FIG. 2B, the RTFSs 240, . . . , 246 may correspond to the RTFSs 122, . . . , 124, the fingerprint vendors 250, . . . , 256 may correspond to the fingerprint match systems 130, and the end-user devices 260, . . . , 266 may correspond to the end-user devices 140, which are illustrated in FIG. 1.

The RTEM 230 may be operable to handle instructions and/or information that enable the identification of a network television station based on the logo, symbol, sign, watermark, and/or text that are typically utilized to represent the network television station. In this regard, the Real-time event manager 230 may be operable to handle instructions and/or information as described above with respect to the Real-time event manager 120 that is illustrated in FIG. 1, for example.

In operation, the RTEM 230 may generate and/or handle one or more interactive event IDs that correspond to a particular set of fingerprints generated by the RTFSs 240, . . . , 246. The RTEM 230 may have determined the interactive event IDs based on live event inputs, time-scheduled event inputs, and/or pre-recorded event inputs. The RTEM 230 may assign or associate the interactive event IDs to their appropriate fingerprints based on the synchronization of its operation to the operation of the RTFSs 240, . . . , 246 via broadcast NTP. The RTEM 120 may also provide television network station identifiers and/or network timing information to the RTFSs 240, . . . , 246. The RTFSs 240, . . . , 246 may communicate the fingerprints, interactive event IDs, the television network station identifiers, and/or the network timing information to their corresponding fingerprint vendors.

The client or end-user devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100*a* in FIG. 2A may also illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

Referring to FIG. 2B, there is shown a portion 100*b* of the ACR system 100 that may comprise the end-user devices 260, . . . , 266 and the fingerprint vendors 250, . . . , 256 shown in FIG. 2A. Also shown are application data servers 270, an analytics module 272, a rules engine 274, a cloud-based content delivery network (CDN) 275, and a content management system (CMS) 276. In addition, FIG. 2B shows a user response module 280 and third-party partners/advertisers 282.

The application data servers 270 may comprise suitable logic, circuitry, code, and/or interfaces that may be operable to receive from a viewer device information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page. For example, content may be provided to a remote control device that is paired to an end-user device for display on a screen of the remote control device. When the remote control device comprises a touch-screen, the remote control device may enable a user to interact with the corresponding end-user device through the touch-screen.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to call the CMS 276 for text, banners, graphics, overlays, and/or video, for example.

The application data servers 270 may also be operable to deliver event schedules to end-user devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., end-user devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the end-user devices. For example, content that may be delivered may comprise text, banners, graphics, overlays, and video. Other examples of content may comprise polls and fun facts, clips to share, games and trivia, and advertising content. These examples are provided by way of illustration and not of limitation. Accordingly, other examples of contents that may be utilized for user interactive events with the end-user devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets (graphics, banners, overlays, video, etc) from the CDN 275.

The analytics module 272 may comprise suitable logic, circuitry, code, and/or interfaces that may be operable to receive user interaction information from the application data servers 270 or directly from the viewing devices. The analytics module 272 may be operable to communicate with the fingerprint vendors 250, . . . , 256 to receive information and determine what is being watched or viewed in various viewer devices. The analytics module 272 may comprise one or more back-end databases to store, mange, and/or process user information.

In operation, content may be provided by the application data servers 270 to one of the end-user devices 260, . . . , 266 in response to receiving an interactive event ID, a network television station, device type, and other data from that viewer device. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on end-user devices. The advertisement servers may also be operable to support the tracking of user impressions and click-throughs and/or to perform other advertising-related functions.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways.

Figure 3A:
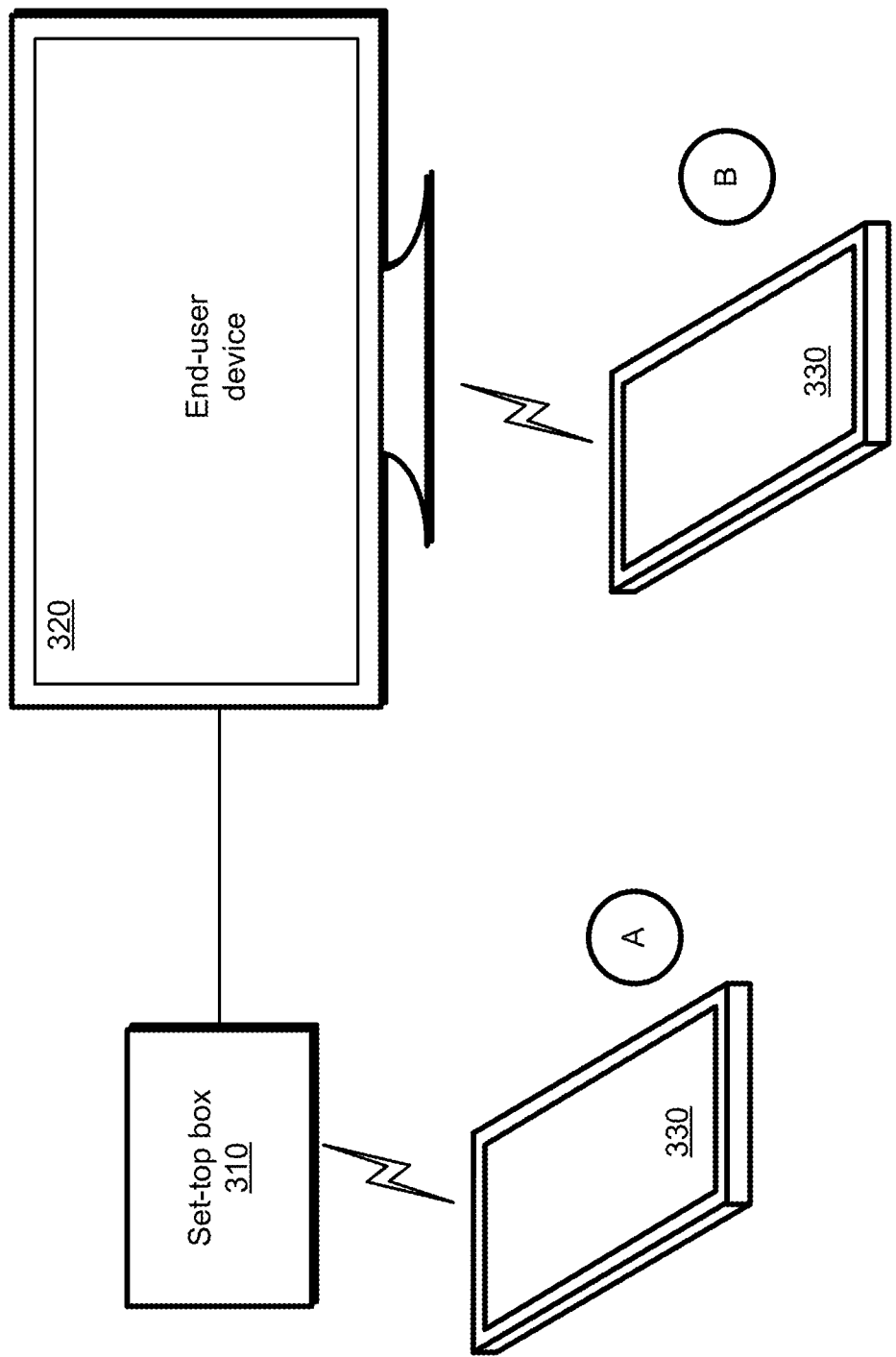
FIGS. 3A-3C are each diagrams that illustrate exemplary scenarios for pairing a universal remote control with a display device, in accordance with embodiments of the invention.
Figure 3B:
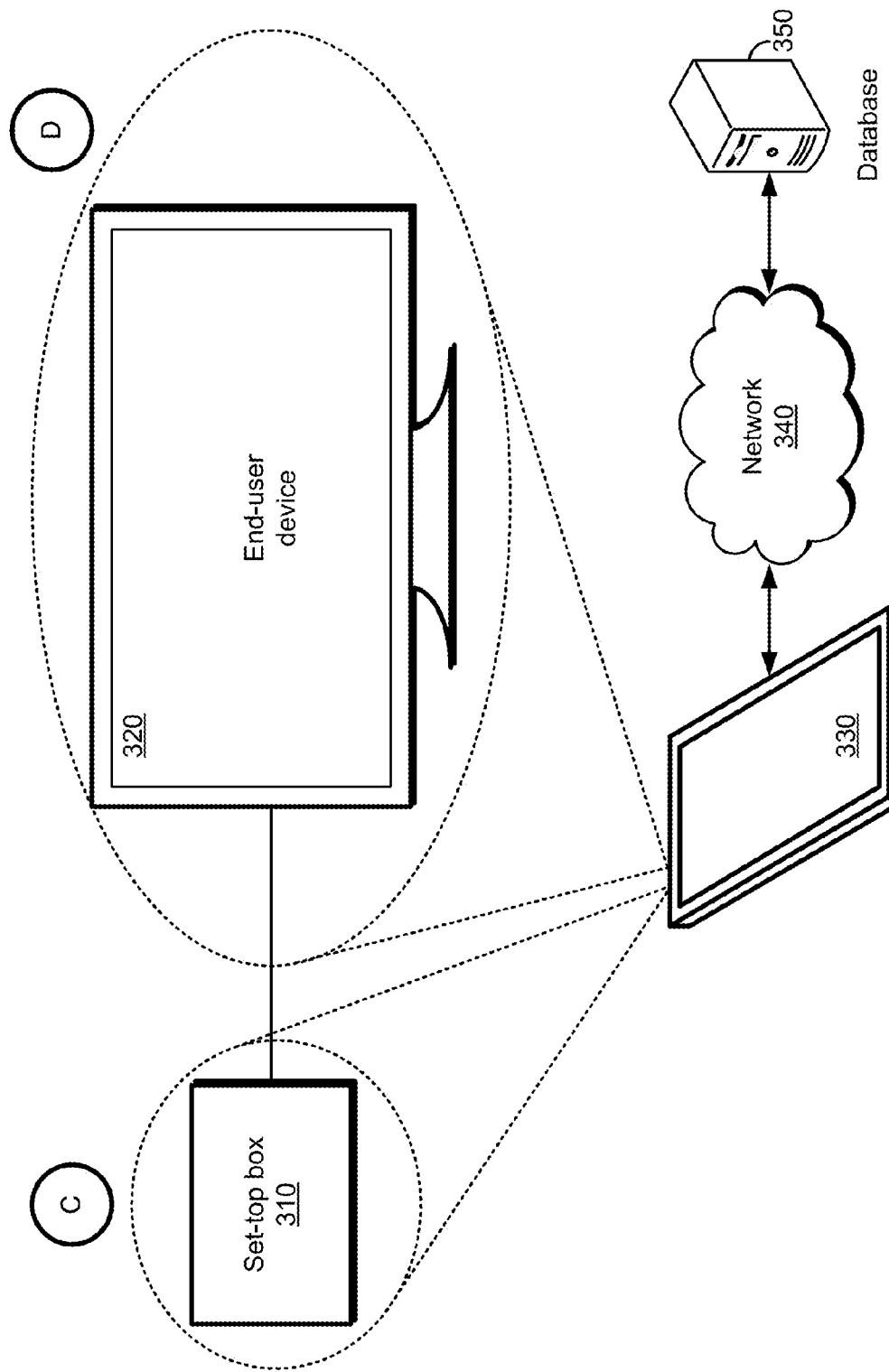
Figure 3C:
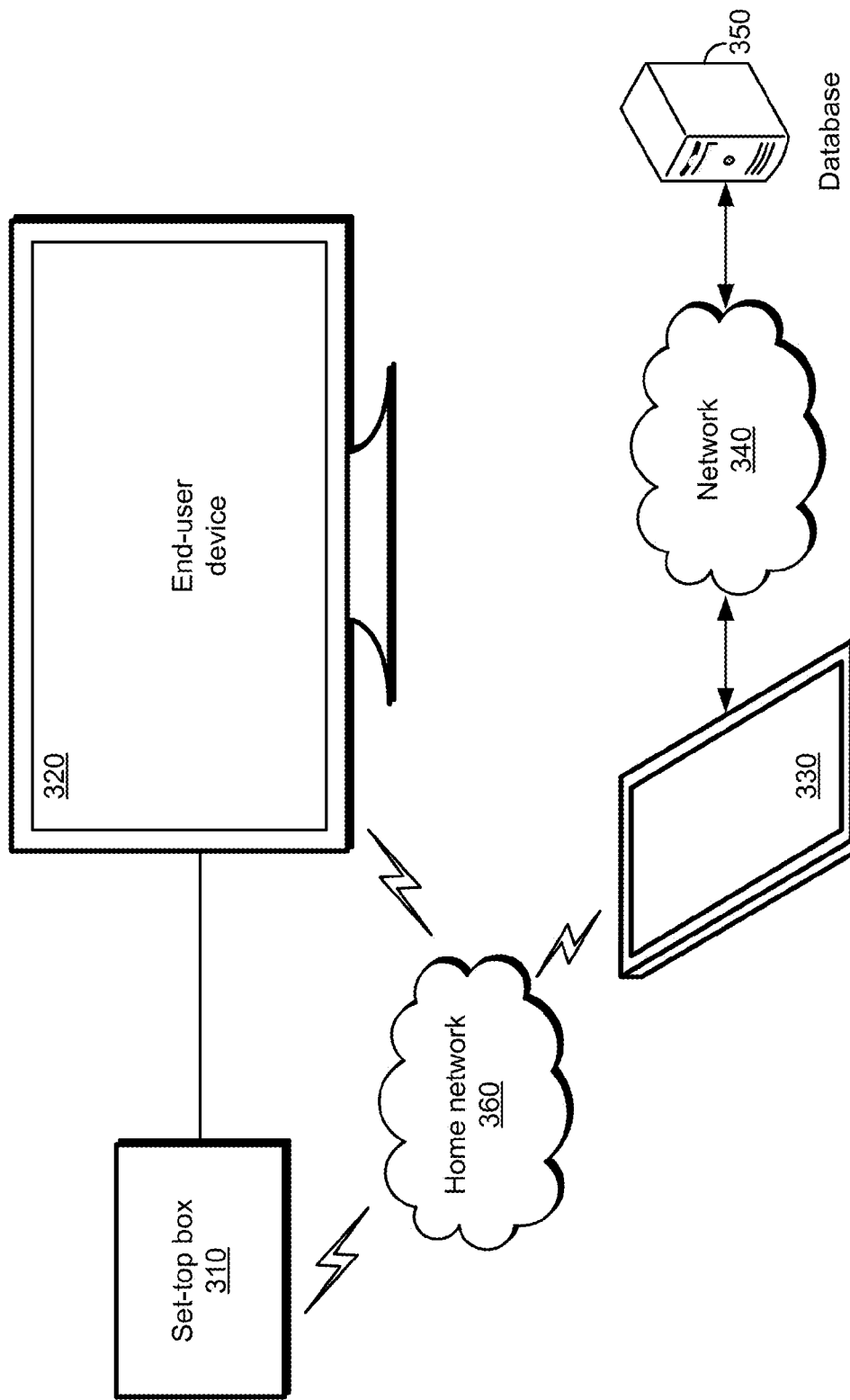

FIGS. 3A-3C are each diagrams that illustrate exemplary scenarios for pairing a universal remote control with a display device, in accordance with embodiments of the invention. Referring to FIG. 3A, there is shown a set-top box 310, an end-user device 320, and a remote control device 330. The end-user device 320 may correspond to one of the end-user devices 140 shown in FIG. 1 or one of the end-user devices 260 and 262 shown in FIGS. 2A and 2B.

The set-top box 310 may comprise suitable logic, circuitry, code, and/or interfaces that may be operable to receive content from a cable or satellite provider, for example, and process the content for communication to the end-user device 320 for display. The set-top box 310 may comprise storage capabilities that enable digital recording and playback of the content received from the cable or satellite provider.

The end-user device 320 may comprise suitable logic, circuitry, code, and/or interfaces that may be operable to receive, process, and display content. The end-user device 320 may be a connected TV, a home theater system, or other like system that may be utilized to display content and that supports ACR operations. The end-user device 320 may be operable to support at least one High-Definition Multimedia Interface (HDMI) to receive encrypted, uncompressed digital audio/video data. The end-user device 320 may also be operable to support one or more digital copy protection schemes such as High-Bandwidth Digital Content Protection (HDCP). While HDMI and HDCP are described above as being supported by the end-user device 320, the invention need not be so limited and other interface technologies and/or data protection technologies may also be supported.

The remote control device 330 may comprise suitable logic, circuitry, code, and/or interfaces that may be operable to control at least a portion of the functionality of the set-top box 310 and at least a portion of the functionality of the end-user device 320. The remote control device 330 may be operable to enable pairing with the end-user device 320 through the exchange of one or more NFC protocol signals. Once the pairing is completed, the remote control device 330 may be utilized to enable user participation in interactive events presented by the end-user device 320. The communication that may occur between the remote control device 330 and the end-user device 320 once the pairing is complete may be performed by more conventional techniques such as infrared (IR) communication, for example.

In operation, when the remote control device 330 is in communication with the set-top box 310, as illustrated by reference A, the remote control device 330 may be operable to control features and/or functions of the set-top box 310. For example, the remote control device 330 may be operable to perform channel selection, video-on-demand, page navigation, recording, playback, and/or other features and/or functions supported by the set-top box 310.

Similarly, when the remote control device 330 is paired to the end-user device 320 and is in communication with the end-user device, as illustrated by reference B, the remote control device 330 may be operable to control features and/or functions of the end-user device 320 and may be operable to enable interactive opportunities between a user and the end-user device. For example, the remote control device 330 may be operable to change the volume and/or picture formats on the end-user device 320. Moreover, when an interactive opportunity is presented, the remote control device 330 may be operable to provide a user with appropriate selections, options, responses, actions, choices, and/or navigational tools (e.g., up, down, left, right arrows), which enable the user to respond to different types of interactive opportunities such as trivia questions, games, polls, user preferences, content selection, and the like.

Referring to FIGS. 3B and 3C, there is shown a different approach for pairing the end-user device 320 with the remote control device 330. As shown in FIG. 3B, the remote control device 330 may utilize image or video capture capabilities to capture an image of the set-top box 310, as illustrated by reference C, and an image of the end-user device 320, as illustrated by reference D. The images may be communicated by the remote control device 330 to a database 350 through a network 340. The database 350 may utilize the images to determine information corresponding to the set-top box 310 and to the end-user device 320. This information may be communicated back to the remote control device 330 through the network 340. Additionally if the remote control device 330 is already paired with end-user device 320 then the make and model of set-top 310 would be discoverable via communication with the end user device 320 based on HDCP negotiation between the end user device 320 and the set-top 310, Discovery of set-top 310 form end user device 320 would eliminate the need to capture an image of the set-top 310 in order to obtain the correct information for remote 330 to control set-top 310.

With respect to the set-top box 310, the information received by the remote control device 330 may comprise control codes and/or additional functionality that may be utilized to control the operations of the set-top box 310. The remote control device 330 may generate a GUI or other graphical user interface that enables the control of the operations of the set-top box 310. In this regard, the information received by the remote control device 330 from the database 350 may comprise graphical information that may be utilized to generate and display the GUI utilized to control the set-top box 310.

With respect to the end-user device 320, the information received by the remote control device 330 may comprise control codes and/or additional functionality that may be utilized to control the operations of the end-user device 320. The remote control device 330 may generate a GUI or other graphical user interface that enables the control of the operations of the end-user device 320. In this regard, the information received by the remote control device 330 from the database 350 may comprise graphical information that may be utilized to generate and display the GUI utilized to control the end-user device 320.

Also received by the remote control device 330 may be a Media Access Control (MAC) address of the end-user device 320. As shown in FIG. 3C, the remote control device 330 may utilize the MAC address, which may represent the address of the end-user device 320 in a home network 360, to pair the remote control device 330 with the end-user device 320. In some embodiments of the invention, the home network 360 may be a WiFi network and the pairing of the remote control device 330 with the end-user device 320 may occur through the exchange of WiFi signals, for example.

The remote control device 330 may be operable to support more than one pairing approach and to select one of those approaches to initiate and complete the pairing with the end-user device 320. While NFC and WiFi have been described above with respect to the pairing operations, the invention need not be so limited and other close-proximity communication technologies and/or networking technologies may also be utilized.

Figure 4:
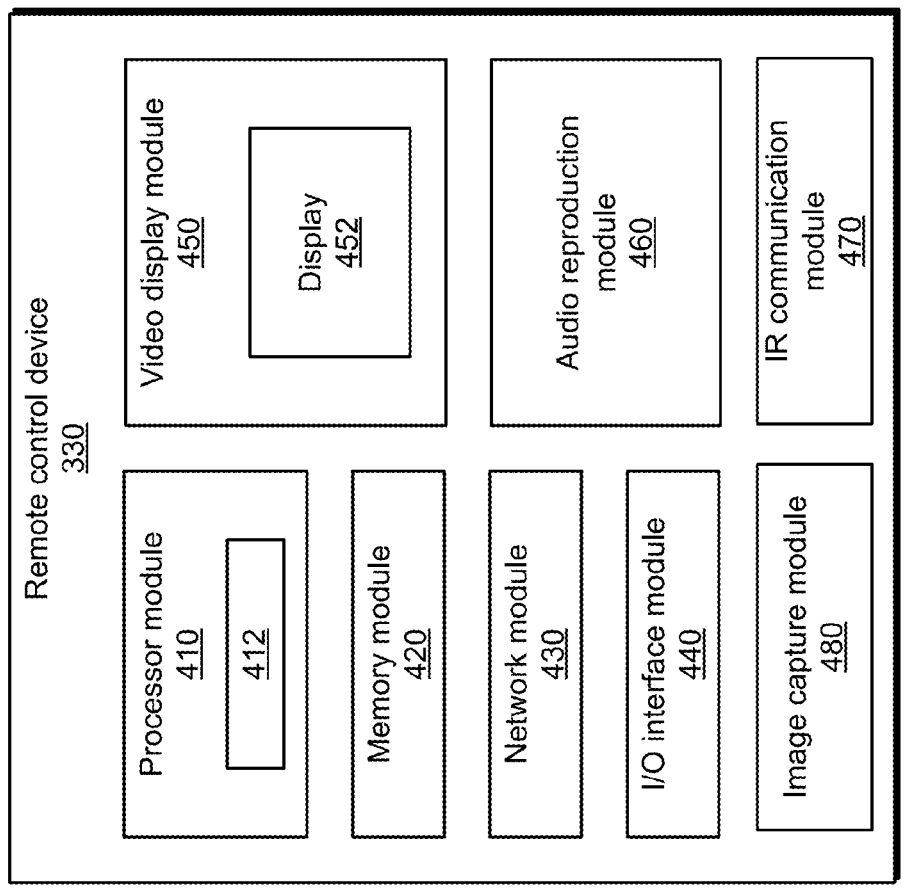
FIG. 4 is a block diagram that illustrates an exemplary universal remote control, in accordance with an embodiment of the invention.

FIG. 4 is a block diagram that illustrates an exemplary universal remote control, in accordance with an embodiment of the invention. Referring to FIG. 4, there is shown an example of an architecture for the remote control device 330 described above. The remote control device 330 may comprise a processor module 410, a memory module 420, a network module 430, and an input/output (I/O) interface module 440. The remote control device 330 may also comprise a video display module 450, an audio reproduction module 460, and an IR communication module 470. The remote control device 330 may also comprise an image capture module 480.

The processor module 410 may comprise suitable logic, circuitry, code, and/or interfaces that may be operable to perform the operations, functions, processes, computations, and the like described herein with respect to remote control devices that may be utilized for enabling interaction with a display device during an interactive event. In this regard, the processor module 410 may be operable to perform control and/or user-interaction functions as well the generation and display of graphical user interfaces to enable the performance of those control and/or user-interaction functions.

The processor module 410 may enable the remote control device 330 to operate in one of many modes. Each of the modes may correspond to a device that is being controlled by the remote control device 330. Moreover, for any display device being controlled, the remote control device 330 may utilize more than one mode based on the interactive opportunity that is being presented to the user.

The processor module 410 may also be operable to handle pairing operations with a display device. In this regard, the processor module 410 may enable the selection of a pairing approach from multiple pairing approaches supported by the remote control device 330. In some instances, a particular pairing approach may be a default approach and another pairing approach is not utilized unless the default pairing approach is unable to complete the pairing process.

The processor module 410 may comprise at least one processing device 412. The processing device 412 may be a central processing unit (CPU), a digital signal processor (DSP), and/or other type of integrated circuit that may be utilized to perform data processing operations. The processing device 412 may utilize an operating system that enables the execution of the various operations and functions described herein with respect to remote control devices.

The memory module 420 may comprise suitable logic, circuitry, code, and/or interfaces that may be operable to store information utilized to enable control operations, including but not limited to, operations that enable interactive opportunities. The network module 430 may comprise suitable logic, circuitry, code, and/or interfaces that may be operable to allow the remote control device 330 to communicate with other devices and/or with one or more networks. The network module 430 may be operable to support one or more communication protocols such as wireline protocols and/or wireless protocols. For example, the network module 430 may be operable to support the exchange of NFC protocol signals and/or WiFi signals.

The network module 430 may enable communication between the remote control device 330 and a paired device utilizing wireless signals. The communication need not be through a network. Instead, the communication may be directly between the remote control device 330 and the paired device. In this regard, the network module 430 may support one or more wireless communication technologies to enable the communication with a paired device.

The I/O interface module 440 may comprise suitable logic, circuitry, code, and/or interfaces that may be operable to enable a user of the remote control device 330 to interact with the device.

The video display module 450 may comprise suitable logic, circuitry, code, and/or interfaces that may be operable to process graphical information for reproduction. For example, the video display module 450 may be utilized to display graphical user interfaces for device control and/or for user interaction. The video display module 450 may comprise a display 452 that may comprise a screen such as a liquid-crystal display (LCD), plasma display, light-emitting diode (LED) display, for example, for video reproduction. In some instances, the display 452 may comprise a touch-screen that enables a user to interact with the remote control device 330 through the display 452. In this regard, the I/O interface module 440 may be operable to handle inputs provided by the user through the touch-screen.

The audio reproduction module 460 may comprise suitable logic, circuitry, code, and/or interfaces that may be operable to process audio content for reproduction. In some instances, the audio reproduction module 460 may comprise speakers (not shown) for audio reproduction.

The IR communication module 470 may comprise suitable logic, circuitry, code, and/or interfaces that may be operable to generate infrared signals to send commands or other control functions to one or more devices. In this regard, the IR communication module 470 may be utilized to support legacy devices in which commands or control functions are received through infrared signals.

The image capture module 480 may comprise suitable logic, circuitry, code, and/or interfaces that may be operable to capture and process images or video. The image capture module 480 may be utilized to capture images for pairing operations, for example. The image capture module 480 may comprise an image sensor (e.g., CMOS sensor, CCD sensor) and image processing hardware and/or software.

In operation, the control functions and interactive operations may be handled by the processor module 410 in the remote control device 330. Graphical user interfaces that enable the control functions and interactive operations may be displayed by the video display module 450. Communication between the remote control device 330 and another device, including but not limited to a paired device, may be carried out by the network module 420 and/or the IR communication module 470. User input provided to control a device and/or to participate in an interactive event may be handled by the I/O interface module 440. In this regard, when the display 452 comprises a touch-screen, user input may be handled by both the display 452 and the I/O interface module 440.

Figure 5B:
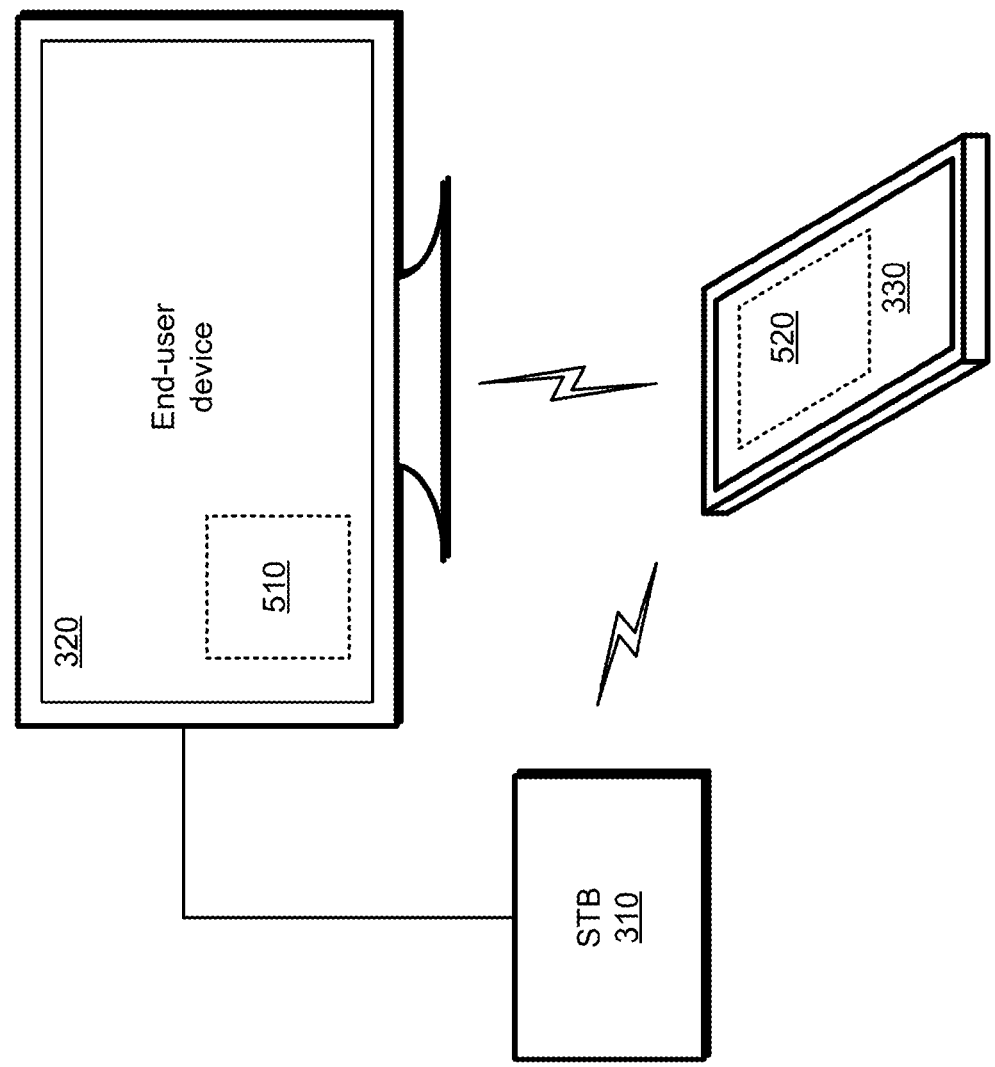

FIGS. 5A-5D are each diagrams that illustrate an exemplary change in operating mode in a universal remote control when an interactive event overlay is displayed on a display device, in accordance with an embodiment of the invention. Referring to FIG. 5A, there is shown the set-top box 310, the end-user device 320, and the remote control device 330 described above with respect to FIGS. 3A-3C. In the exemplary scenario shown in FIG. 5A, the remote control device 330 may operate as a universal remote control that enables control of both the set-top box 310 and the end-user device 320 from a single remote control. The remote control device 330 may have a graphical user interface 500 that may be a default interface for universal remote control operations. For example, the graphical user interface 500 may typically be set up to control functions of the set-top box 310 and may be changed to control functions of the end-user device 320 when appropriate. In this regard, the remote control device 330 may be said to be in a default or initial mode, which in turn utilizes the graphical user interface 500.

Referring to FIG. 5B, when an interactive opportunity is presented to the user through the end-user device 320, the remote control device 330 may change modes and that change may result in an updated or a different graphical user interface. In this scenario, a graphical user interface 520, different from the graphical user interface 500 shown in FIG. 5A, may be displayed on the screen of the remote control device 330 when an interactive event overlay 510 is displayed on the end-user device 320. The interactive event overly 510 may result from a triggering mechanism associated with ACR operations or from a metadata comprised within the video content stream such as ID3 tags in an MP3 file, for example. The graphical user interface 520 may enable the user to participate in the interactive event corresponding to the interactive event overlay 510. Once the interactive event overlay 510 is no longer displayed, that is, the interactive event is completed or it is over, the remote control device 330 may return to its previous mode or to another mode and may display a graphical user interface that corresponds to the current mode.

In an embodiment of the invention, the change in the screen or graphical user interface from its default interface may occur automatically when an event triggering mechanism (e.g., ID3 tags in an MP3 stream, ACR operation) is received by the remote control device 330. The default interface may be based on a selected input on the end-user device 320 (e.g., connected TV, home theater receiver). With HDMI and/or HDCP, a user may not need to program the default interface. For example, the end-user device 320 is on HDMI 1 and the HDCP negotiation indicates that the set-top box 310 is a Motorola set-top box as well as the corresponding model number. This approach may also be utilized to download control codes for the set-top box without having to use an image matching operation. Once the make and model number of the set-top box 310 are known, the default interface may be one that is suitable for a Motorola set-top box on HDMI 1.

Referring to FIGS. 5C and 5D, there is shown an example of the change in operating mode and graphical user interface described above with respect to FIGS. 5A and 5B. As shown in FIG. 5C, the end-user device 320 may display content associated with a talk show. The operating mode of the remote control device 330 may be such that a graphical user interface 500 is presented that enables channel control for the set-top box 310 and volume control for the end-user device 320.

In FIG. 5D, the host of the talk show welcomes a guest, which in this exemplary scenario is the actor Steve Carrell. During the interview, an interactive event overly 510 is displayed on the end-user device 320. Since the end-user device 320 and the remote control device 330 are paired, the presence of the interactive event overly 510 is notified to the remote control device 330, which in turn may change its mode of operation and graphical user interface. In this example, the graphical user interface 520 is now displayed on the screen of the remote control device 330. The graphical user interface 520 comprises content pushed to the remote control device 330 from the end-user device 320. The content may comprise a picture of the actor, some information about the actor, some information about a new movie being discussed during the interview, and/or other like information. The content may be determined based on a selection between multiple options related to the interview being shown on the end-user device 320. For example, a first option (Option 1 button) may be selected or chosen when the user would like to get more information about the new movie and a second option (Option 2 button) may be selected or chosen when the user is not interested in additional information about the new movie. When the first option is selected, additional content may be pushed or received by the remote control device 330 regarding the new movie. When the second option is selected, the interactive event may be terminated and the interactive event overlay 510 may be removed. Once the interactive event is terminated or completed, the remote control device 330 may return to its initial mode or to another mode of operation.

The scenarios described in FIGS. 5A-5D are provided by way of illustration and not of limitation. Different interactive event overlays, graphical user interfaces, functional operations, and/or information may be utilized to enable a remote control device to provide an interactive platform from which to participate in interactive events while also providing controlling functionality to control the operation of one or more devices.

Figure 6:
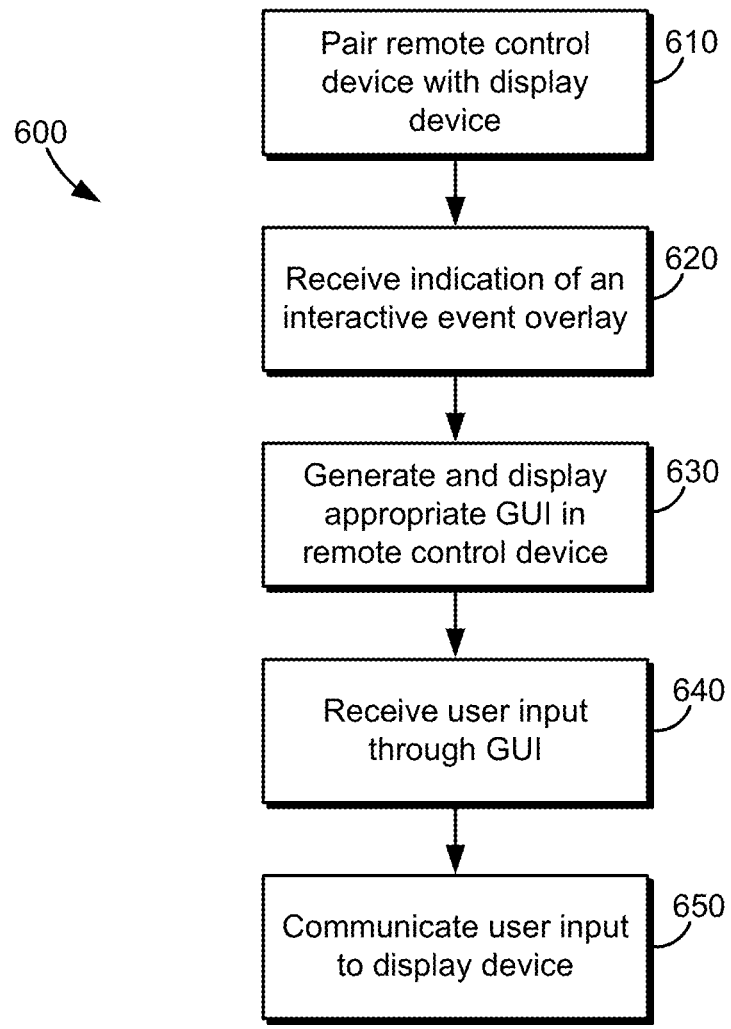
FIGS. 6, 7, and 8 are each a flow diagram that illustrates exemplary steps for utilizing a universal remote control with a display device that supports automatic content recognition, in accordance with various embodiments of the invention.
Figure 7:
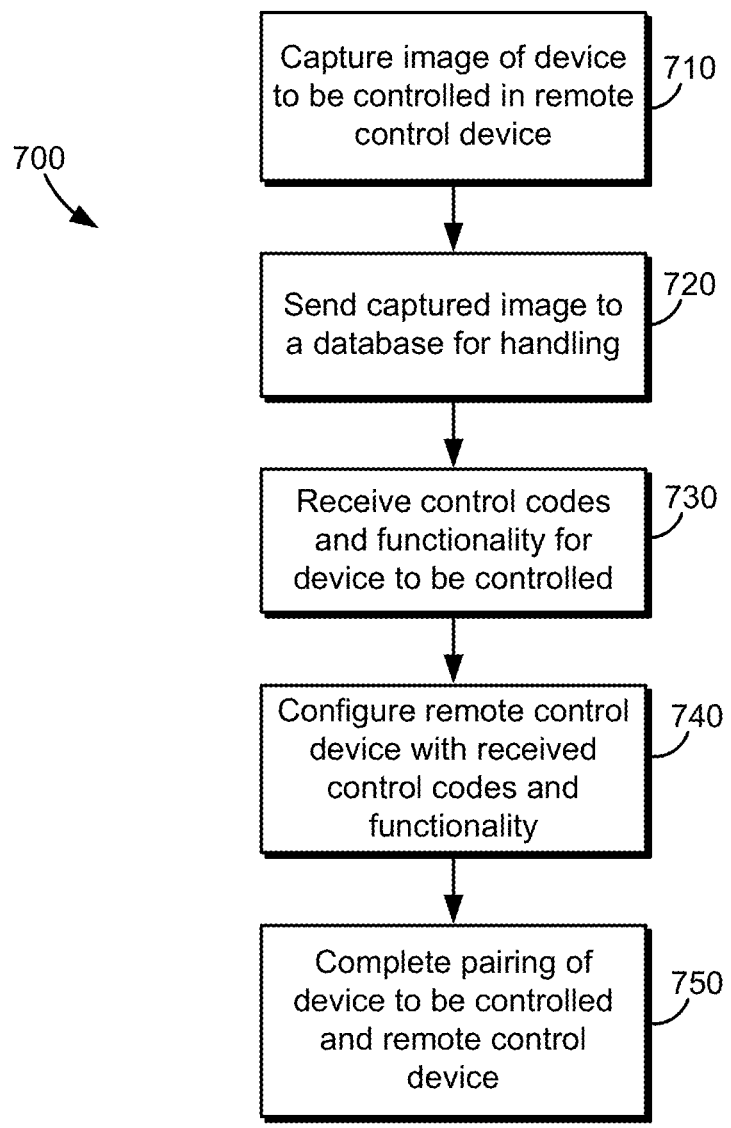
Figure 8:
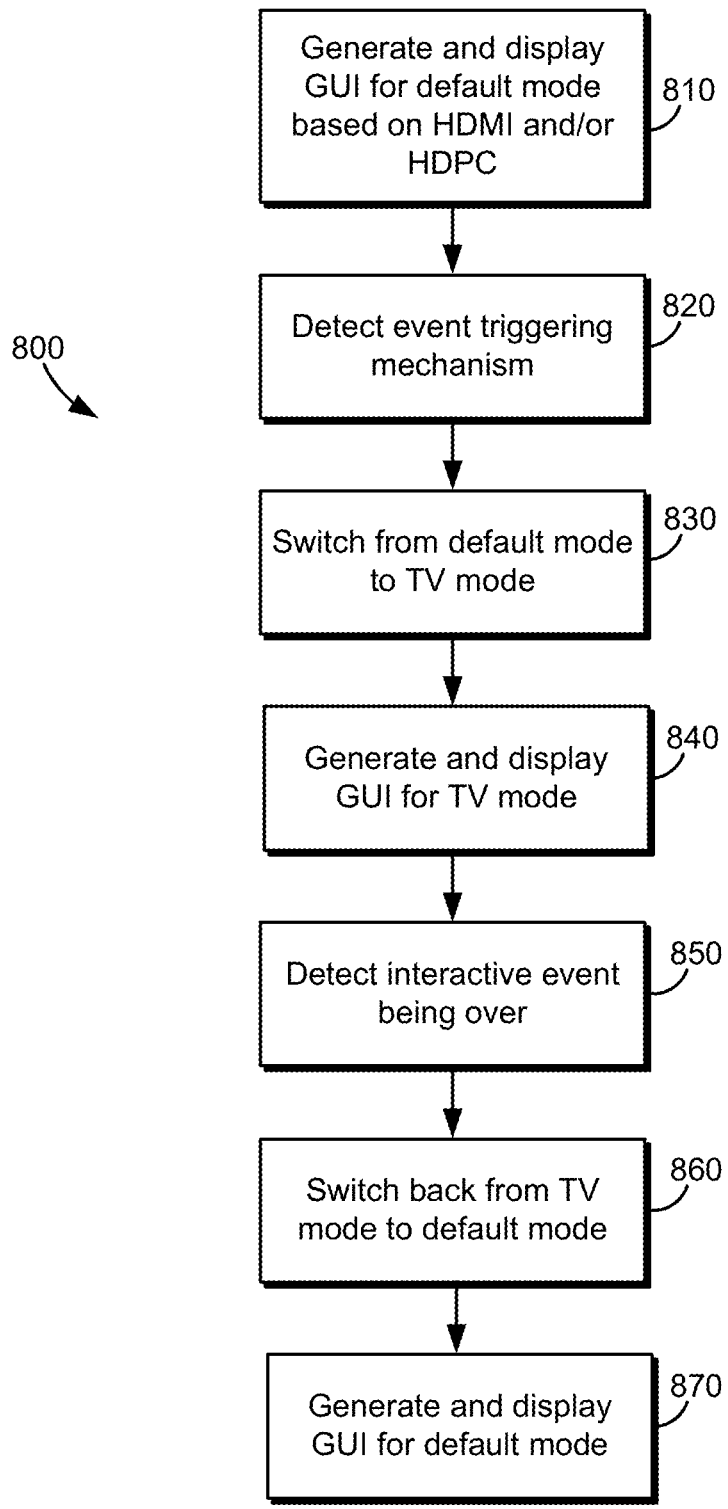

FIGS. 6, 7, and 8 are each a flow diagram that illustrates exemplary steps for utilizing a universal remote control with a display device that supports automatic content recognition, in accordance with various embodiments of the invention. Referring to FIG. 6, there is shown a flow chart 600 in which, at step 610, a remote control device may be paired with a display device. The remote control device may be the remote control device 330 described above, for example. The display device may be an end-user device 140, an end-user device 260 or 262, or an end-user device 320, for example. At step 620, the remote control device may receive an indication of an interactive event overlay. At step 630, the remote control device may generate and display a graphical user interface that is appropriate to enable a user to participate in the interactive opportunity being presented by the display device. At step 640, the remote control device may receive user input as part of the user participation. The user input may be received through the graphical user interface. For example, a user may navigate and select options provided by the graphical user interface. When the remote control device comprises a touch-screen, the user input may be provided to the remote control device through the touch-screen. At step 650, the user input may be communicated to the display device by the remote control device. Communication of the user input may be done through a wireless connection or through an IR signal, for example.

Referring to FIG. 7, there is shown a flow chart 700 in which, at step 710, a remote control device may capture an image of a device to be controlled, such as a connected TV, home theater receiver, or set-top box, for example. At step 720, the image of the device may be sent to a database for handling. The database may determine whether there is a match for the image and information corresponding that match. At step 730, the remote control device may receive, from the database, control codes and functionality corresponding to the device to be controlled. At step 740, the remote control device may be configured based on the control codes and functionality received. For example, the remote control device may change its mode of operation and its graphical user interface as a result of the control codes and functionality received. At step 750, the pairing of the device to be controlled and the remote control device may be completed.

Referring to FIG. 8, there is shown a flow chart 800 in which, at step 810, a remote control device may generate and display a graphical user interface for a default mode of operation based on HDMI and/or HDPC information of a display device. At step 820, the remote control device may detect that an interactive event has been triggered by an event triggering mechanism. In this regard, the remote control device may detect a signal or some other indication that corresponds to the event triggering mechanism, which may be received from the display device. At step 830, in response to the detection of the interactive event, the remote control device may switch or change from a default mode of operation, which may correspond to a set-top box control screen, for example, to a TV mode of operation that enables control of the display device for interactive operations. At step 840, the remote control device may generate and display a graphical user interface for the TV mode.

At step 850, the remote control device may detect that the interactive event is over. In this regard, the remote control device may detect a signal or some other indication that corresponds to the completion or termination of the interactive event and that is received from the display device. At step 860, in response to the detection that the interactive event is over, the remote control device may switch back to its default mode of operation. At step 870, the remote control device may generate and display a graphical user interface for the default mode.

In another embodiment of the invention, a method is described in which a remote control, such as the remote control device 330, may be paired with a display device, such as the end-user device 320, which may be operable to perform automatic content recognition on video content. The remote control device may generate one or more NFC protocol signals to pair the remote control device with the display device. A trigger signal may be received in the remote control device from the display device. The trigger signal may correspond to an interactive event overlay (e.g., interactive event overly 510) being displayed on the display device. The remote control device may generate a graphical user interface (GUI) for display on a screen (e.g., display 452) of the remote control device that corresponds to the interactive event overlay. The screen may comprise a touch-screen, for example. Moreover, the remote control device may communicate one or more signals to the display device in response to user input received by the remote control device from information provided through the GUI. The communication may be performed by, for example, the network module 430 and/or the IR communication module 470 described above with respect to FIG. 4.

In another aspect of this embodiment of the invention, the remote control device may capture an image of the display device. In this regard, the image may be captured utilizing the image capture module 480 described above with respect to FIG. 4. The remote control device may receive graphical and functional information corresponding to a default GUI from a database (e.g., database 350) based on the captured image. The remote control device may generate the default GUI for display on the screen of the remote control device. The remote control device may be operable to replace the default GUI with the GUI that corresponds to the interactive event overlay after reception of the trigger signal.

In another aspect of this embodiment of the invention, the remote control device may capture an image of the display device and may receive, based on the captured image, a MAC address of the display device in a local wireless network (e.g., home network 350) comprising the display device. The remote control device may be paired with the display device utilizing a wireless connection based on the MAC address received. The wireless connection may comprise a WiFi connection.

In yet another aspect of this embodiment of the invention, the remote control device may capture an image of a set-top box (e.g., set-top box 310) communicatively coupled to the display device. The remote control device may receive graphical and functional information corresponding to a default GUI from a database (e.g., database 350) based on the captured image. The remote control device may generate the default GUI for display on the screen of the remote control device. The remote control device may replace the default GUI with the GUI that corresponds to the interactive event overlay after reception of the trigger signal.

Another embodiment of the invention may provide a non-transitory machine and/or computer readable storage and/or media, having stored thereon, a machine code and/or a computer program having at least one code section executable by a machine and/or a computer, thereby causing the machine and/or computer to perform the steps as described herein for a universal remote control.

Accordingly, the present invention may be realized in hardware, software, or a combination of hardware and software. The present invention may be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a remote control device that is paired with a display device, wherein:
      the display device communicates with an automatic content recognition (ACR) system to perform ACR on video content; and
      the ACR system timing assignment of same interactive event identifiers to different sets of video fingerprints that are generated from same video content by different fingerprint technologies from multiple vendors based on a common reference clock, wherein the interactive event identifiers are utilized by the display device to trigger one or more interactive events:
   receiving a trigger signal from the display device, the trigger signal corresponding to an interactive event overlay being displayed on the display device;
   generating for display on a screen of the remote control device, a graphical user interface (GUI) that corresponds to the interactive event overlay; and
   communicating one or more signals to the display device in response to user input received by the remote control device from information provided through the GUI.

2. The method of claim 1, comprising generating one or more near field communication (NFC) protocol signals to pair the remote control device with the display device.

3. The method of claim 1, wherein the screen of the remote control device comprises a touch-screen that receives the user input.

4. The method of claim 1, comprising:
   capturing in the remote control device, an image of at least a portion of the display device;
   receiving graphical and functional information corresponding to a default GUI from a database based on the captured image; and
   generating the default GUI for display on the screen of the remote control device.

5. The method of claim 4, comprising replacing the default GUI with the GUI that corresponds to the interactive event overlay after reception of the trigger signal.

6. The method of claim 1, comprising:
   capturing in the remote control device, an image of at least a portion of the display device;
   receiving based on the captured image, a Media Access Control (MAC) address of the display device in a local wireless network comprising the display device; and
   pairing the remote control device with the display device utilizing a wireless connection based on the MAC address received.

7. The method of claim 6, wherein the wireless connection comprises a WiFi connection.

8. The method of claim 1, comprising:
   capturing in the remote control device, an image of at least a portion of a set-top box communicatively coupled to the display device;
   receiving graphical and functional information corresponding to a default GUI from a database based on the captured image; and
   generating the default GUI for display on the screen of the remote control device.

9. The method of claim 8, comprising replacing the default GUI with the GUI that corresponds to the interactive event overlay after reception of the trigger signal.

10. A system, comprising:
    a remote control hardware device that is paired with a display device, wherein:
       the display device communicates with an automatic content recognition (ACR) system to perform ACR on video content; and
       the ACR system timing assignment of same interactive event identifiers to different sets of video fingerprints that are generated from same video content by different fingerprint technologies from multiple vendors based on a common reference clock, wherein the interactive event identifiers are utilized by the display device to trigger one or more interactive events, and the remote control hardware device:
receives a trigger signal from the display device, the trigger signal corresponding to an interactive event overlay being displayed on the display device;
generates for display on the screen, a graphical user interface (GUI) corresponding to the interactive event overlay; and
communicates one or more signals to the display device in response to user input received from information provided through the GUI.

11. The system of claim 10, wherein the remote control hardware device generates one or more near field communication (NFC) protocol signals to pair the remote control hardware device with the display device.

12. The system of claim 10, wherein the screen of the remote control hardware device comprises a touch-screen that receives the user input.

13. The system of claim 10, wherein:
the remote control hardware device comprises an image capture device; and
the remote control hardware device:
captures at least a portion of an image of the display device utilizing the image capture device;
receives graphical and functional information corresponding to a default GUI from a database based on the captured image; and
generates the default GUI for display on the screen.

14. The system of claim 13, wherein the remote control hardware device replaces the default GUI with the GUI that corresponds to the interactive event overlay after reception of the trigger signal.

15. The system of claim 10, wherein:
the remote control hardware device comprises an image capture device; and
the remote control hardware device:
captures at least a portion of an image of the display device utilizing the image capture device;
receives based on the captured image, a Media Access Control (MAC) address of the display device in a local wireless network comprising the display device; and
pairs the remote control hardware device with the display device utilizing a wireless connection based on the MAC address received.

16. The system of claim 15, wherein the wireless connection comprises a WiFi connection.

17. The system of claim 10, wherein:
the remote control hardware device comprises an image capture device; and
the remote control hardware device:
captures at least a portion of an image of a set-top box communicatively coupled to the display device utilizing the image capture device;
receives graphical and functional information corresponding to a default GUI from a database based on the captured image; and
generates the default GUI for display on the screen.

18. The system of claim 17, wherein the remote control hardware device replaces the default GUI with the GUI that corresponds to the interactive event overlay after reception of the trigger signal.

19. A system, comprising:
a hardware device comprising a touch-screen, wherein the hardware device:
pairs with a display device that communicates with an automatic content recognition (ACR) system to perform ACR on video content, wherein the ACR system timing assignment of same interactive event identifiers to different sets of video fingerprints that are generated from same video content by different fingerprint technologies from multiple vendors based on a common reference clock, wherein the interactive event identifiers are utilized by the display device to trigger one or more interactive events; and
interacts with the paired display device in response to one or more interactive event overlays being displayed on the display device, wherein the interaction for each of the one or more interactive event overlays is via a corresponding graphical user interface (GUI) displayed on the touch-screen.

20. The system of claim 19, wherein the hardware device pairs with the display device by one or both of:
an exchange of near field communication protocol signals between the hardware device and the display device; and
an exchange of WiFi protocol signals between the hardware device and the display device after reception by the device of a MAC address corresponding to the display device.

* * * * *